United States Patent
Washizuka et al.

(10) Patent No.: US 10,195,907 B2
(45) Date of Patent: Feb. 5, 2019

(54) HEAVY-DUTY TIRE

(71) Applicant: SUMITOMO RUBBER INDUSTRIES LTD., Kobe-shi, Hyogo (JP)

(72) Inventors: Masakazu Washizuka, Kobe (JP); Daisuke Todoroki, Kobe (JP); Atsushi Maehara, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 475 days.

(21) Appl. No.: 14/903,733

(22) PCT Filed: Jul. 14, 2014

(86) PCT No.: PCT/JP2014/068724
§ 371 (c)(1),
(2) Date: Jan. 8, 2016

(87) PCT Pub. No.: WO2015/016051
PCT Pub. Date: Feb. 5, 2015

(65) Prior Publication Data
US 2016/0159158 A1    Jun. 9, 2016

(30) Foreign Application Priority Data

Jul. 30, 2013  (JP) ................. 2013-158112
Aug. 5, 2013   (JP) ................. 2013-162627
Apr. 25, 2014  (JP) ................. 2014-091780

(51) Int. Cl.
*B60C 11/03*   (2006.01)
*B60C 11/12*   (2006.01)
*B60C 11/13*   (2006.01)

(52) U.S. Cl.
CPC ........ *B60C 11/033* (2013.01); *B60C 11/0304* (2013.01); *B60C 11/0306* (2013.01);
(Continued)

(58) Field of Classification Search
CPC .................. B60C 11/0306; B60C 11/125
See application file for complete search history.

(56) References Cited

U.S. PATENT DOCUMENTS

2006/0102267 A1 * 5/2006 Takahashi ........... B60C 11/0306
                                                       152/209.18
2011/0220259 A1 * 9/2011 Suzuki ................. B60C 11/00
                                                       152/209.18

(Continued)

FOREIGN PATENT DOCUMENTS

CA    2063950   *  9/1992
EP    0541004   *  5/1993

(Continued)

OTHER PUBLICATIONS

English machine translation of EP0541004. (Year: 1993).*

(Continued)

*Primary Examiner* — Robert C Dye
(74) *Attorney, Agent, or Firm* — Birch, Stewart, Kolasch & Birch, LLP

(57) ABSTRACT

A tread portion (2) has a pair of center main grooves (11) extending zigzag and continuously in a tire circumference direction, a pair of shoulder main grooves (12), a center land portion (13), a pair of middle land portions (14), and a pair of shoulder land portions (15). The center main groove (11) has a first groove edge (11a) on the tire equator side and a second groove edge (11b) on the tread edge side. The shoulder main groove (12) has a third groove edge (12a) on the tire equator side and a fourth groove edge (12b) on the tread edge side. The middle land portion (14) is provided (Continued)

with a plurality of middle lateral shallow grooves (30) connecting between apex portions (11h) on the most tread edge side of the second groove edge (11b) and apex portions (12c) on the most tire equator side of the third groove edge (12a); and a plurality of first middle lateral sipes (31) extending along the middle lateral shallow grooves (30) at the groove bottoms of the middle lateral shallow grooves (30) and connecting between the center main groove (11) and the shoulder main groove (12).

20 Claims, 9 Drawing Sheets

(52) U.S. Cl.
CPC ........ *B60C 11/0309* (2013.01); *B60C 11/125* (2013.01); *B60C 11/1236* (2013.01); *B60C 11/1259* (2013.01); *B60C 11/1353* (2013.01); *B60C 2011/0334* (2013.01); *B60C 2011/0346* (2013.01); *B60C 2011/0367* (2013.01); *B60C 2011/0372* (2013.01); *B60C 2011/1209* (2013.01); *B60C 2200/06* (2013.01)

(56) References Cited

U.S. PATENT DOCUMENTS

| | | | |
|---|---|---|---|
| 2011/0220261 A1 | 9/2011 | Matsuzawa | |
| 2011/0226397 A1* | 9/2011 | Hamada | B60C 11/11 152/209.18 |
| 2012/0216931 A1* | 8/2012 | Shiono | B60C 11/0306 152/209.18 |

FOREIGN PATENT DOCUMENTS

| | | |
|---|---|---|
| EP | 1 759 890 A1 | 3/2007 |
| EP | 2 497 655 A1 | 9/2012 |
| JP | 52-44903 A | 4/1977 |
| JP | 63-106111 A | 5/1988 |
| JP | 7-172112 A | 7/1995 |
| JP | 2003-25809 A | 1/2003 |
| JP | 2011-84186 A | 4/2011 |
| JP | 2011-98622 A | 5/2011 |
| JP | 2012-20714 A | 2/2012 |
| JP | 2012-153156 * | 8/2012 |
| JP | 2012-153156 A | 8/2012 |
| WO | WO 2010/055659 A1 | 5/2010 |
| WO | WO 2013/014253 A1 | 1/2013 |

OTHER PUBLICATIONS

English machine translation of JP2012-153156. (Year: 2012).*
English machine translation of JP2012-020714. (Year: 2012).*
English machine translation of JP07-172112. (Year: 1995).*
Extended European Search Report dated Jan. 30, 2017, in European Patent Application No. 14832368.6.
International Search Report, issued in PCT/JP2014/068724, dated Oct. 21, 2014.
Written Opinion of the International Searching Authority, issued in PCT/JP2014/068724, dated Oct. 21, 2014.
Extended European Search Report dated May 7, 2018, in European Patent Application No. 18155171.4.

* cited by examiner

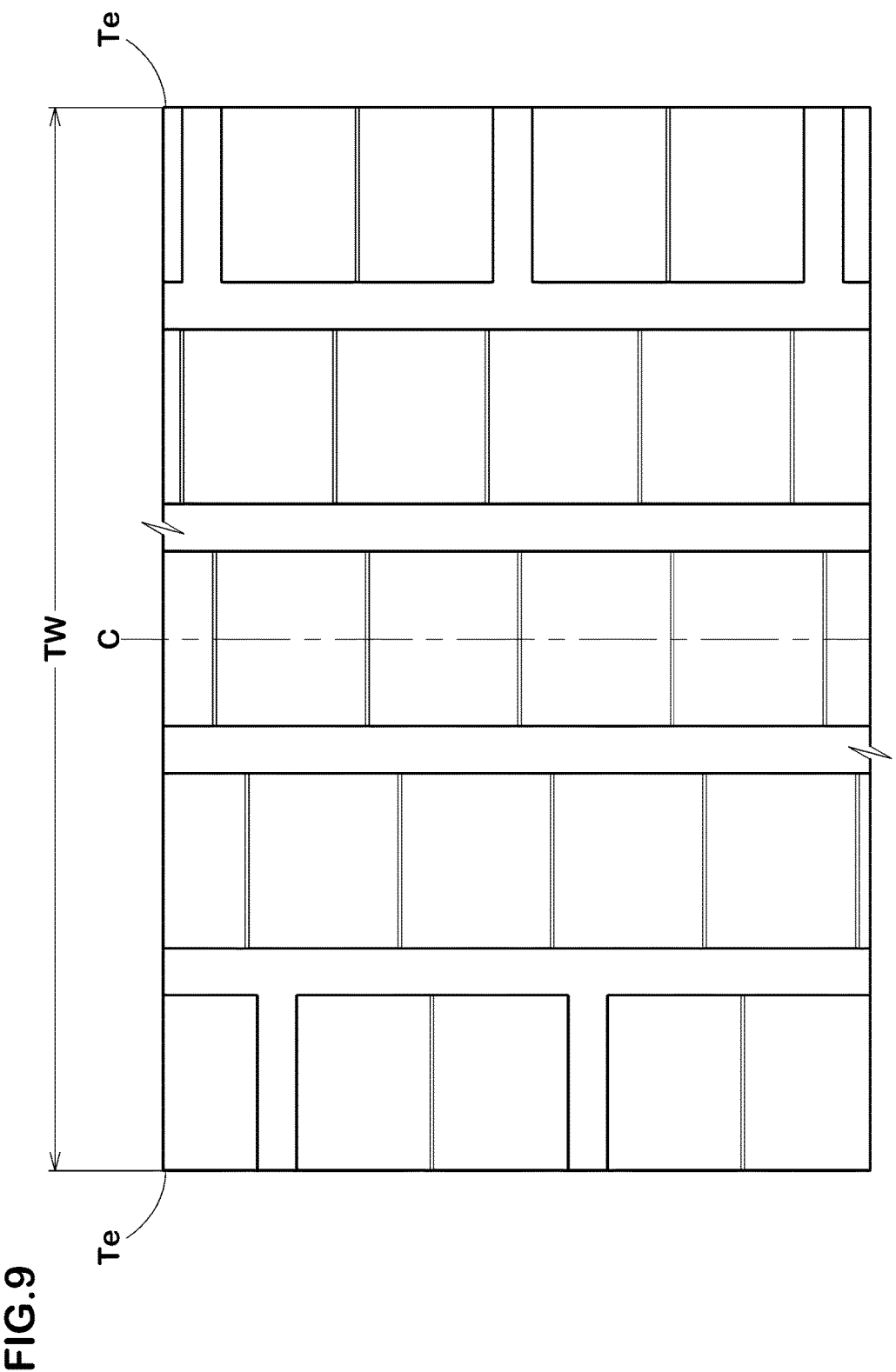

HEAVY-DUTY TIRE

TECHNICAL FIELD

The present invention relates to a heavy duty tire improved in uneven wear resistance.

BACKGROUND

In a heavy duty tire for use with trucks, buses and the like, the tread portion is conventionally provided with a plurality of main grooves extending in the tire circumferential direction and a plurality of lateral grooves extending in the tire axial direction. By these grooves, various performances required for the tire such as wet performance, rolling resistance and uneven wear resistance are enhanced.

For example, in the following Patent Document 1, there is disclosed a heavy duty tire provided in the tread portion with hexagonal blocks divided by a plurality of main grooves extending in a zigzag shape (circumferential grooves 10, 11 and circumferential narrow groove 24 in the document), and a plurality of lateral grooves (lug grooves 25, 26, 27 in the document). Such tire can reduce tire noise, while improving wet performance and uneven wear resistance.

Further, in the following Patent Document 2, there has been proposed a heavy duty tire provided in the tread portion with a plurality of blocks having a substantially hexagonal shape. In this heavy duty tire, an effect is expected such that, by mutually shifting edges of the respective blocks so as to strike a road surface at different timings, the sound when the blocks strike the road surface is changed to white noise.

PRIOR ART DOCUMENTS

Patent Documents

Patent document 1: Japanese Patent Publication No. 2011-98622
Patent document 2: International Publication No. WO2010/055659

In the heavy duty tire disclosed in the Patent Document 1, however, since the depth of the lateral grooves is 80% to 90% of the depth of the main grooves, there is a possibility that the block rigidity decreases, and it is difficult to sufficiently improve the rolling resistance and uneven wear resistance.

Further, the drainage capacity of the main grooves extending in a zigzag shape of the heavy duty tire disclosed in the Patent Document 1 has a tendency to become insufficient when compared with main grooves extending straight, therefore, it is difficult to sufficiently improve the wet performance of the tire.

Furthermore, in the heavy duty tire disclosed in the Patent Document 2, the ground contact pressure is concentrated on the edges of the blocks, and uneven wear such as heel-and-toe wear in which that portion wears prematurely is liable to occur. Meanwhile, there have been proposed a tire having a tread portion with a high land ratio in order to improve the wear resistance. This tire has a problem of having a low wet performance.

SUMMARY OF THE INVENTION

Problems that the Invention is to Solve

The present invention has been devised in view of the circumstances as described above, and a main object is to provide a heavy duty tire in which the uneven wear resistance is improved, while improving the rolling resistance performance and wet performance.

Means for Solving the Problems

The present invention is a heavy duty tire provided in a tread portion with
a pair of center main grooves disposed on both outer sides of the tire equator and extending in a zigzag shape continuously in the tire circumferential direction, and
a pair of shoulder main grooves disposed outside the center main grooves in the tire axial direction and extending in a zigzag shape continuously in the tire circumferential direction so that a center land portion between a pair of the center main grooves, a pair of middle land portions between the center main grooves and the shoulder main grooves, and a pair of shoulder land portions located outside the shoulder main grooves in the tire axial direction are defined, and the tire is characterized in that
the center main groove has a first groove edge on the tire equator side and a second groove edge on the tread edge side,
the shoulder main groove has a third groove edge on the tire equator side and a fourth groove edge on the tread edge side,
the middle land portion is provided with
a plurality of middle lateral shallow grooves connecting the most tread edge side apex portions of the second groove edge of the center main groove, and the most tire equator side apex portions of the third groove edge of the shoulder main groove,
a first middle lateral sipe extending along each of the middle lateral shallow grooves at the groove bottom of the middle lateral shallow groove and connecting the shoulder main groove and the center main groove, and
a plurality of second middle lateral sipes formed between the circumferentially adjacent middle lateral shallow grooves, and connecting the most tire equator side apex portions of the second groove edge of the center main groove and the most tread edge side apex portions of the third groove edge of the shoulder main groove.

In the heavy duty tire according to the present invention, the groove depth of the middle lateral shallow grooves is preferably 10% to 30% of the groove depth of the center main grooves.

In the heavy duty tire according to the present invention, the sum of the groove depth of the middle lateral shallow grooves and the depth of the first middle lateral sipes, and the depth of the second middle lateral sipes are preferably 50% to 80% of the groove depth of the center main grooves.

In the heavy duty tire according to the present invention, a ratio Bm/Am of
a length Am in the tire axial direction between the most tire equator side apex portions of said second groove edge and the most tread edge side apex portions of the third groove edge, and
a length BM in the tire axial direction between the most tread edge side apex portions of the second groove edge and the most tire equator side apex portions of the third groove edge is preferably 0.75 to 0.85.

In the heavy duty tire according to the present invention, a ratio Bc/Ac of
a length Ac in the tire axial direction between the most tread edge side apex portions of the first groove edge on one side of the tire equator, and the most tread edge side apex portions of the first groove edge on the other side of the tire equator, and a length Bc in the tire axial direction between the most tire equator side apex portions of the first groove edge on the one side, and the most tire equator side apex portions of the first groove edge on the other side is preferably 0.75 to 0.85.

In the heavy duty tire according to the present invention, a distance in the tire axial direction between the most tread edge side apex portions of the third groove edge, and the most tire equator side apex portions of the fourth groove edge of the shoulder main groove is preferably 2 to 6 mm.

In the heavy duty tire according to the present invention, the most tire equator side apex of the second groove edge of the center main groove is provided with a longitudinal edge extending along a tire circumferential direction, and a ratio L/P of a length L in the tire circumferential direction of the longitudinal edge and the interval P between the circumferentially adjacent first middle lateral sipes is preferably 0.1 to 0.4.

In the heavy duty tire according to the present invention, it is desirable that the ratio Wc:Wm:Ws of an average width Wc in the tire axial direction of the center land portion, an average width Wm in the tire axial direction of the middle land portion, and an average width Ws in the tire axial direction of the shoulder land portion is 1.00:1.00 to 1.08:1.03 to 1.13.

In the heavy duty tire according to the present invention, it is desirable that the middle lateral shallow grooves, the first middle lateral sipes and the second middle lateral sipes provided in the middle land portion on one side of the tire equator are different in the direction with respect to the tire axial direction from the middle lateral shallow grooves, the first middle lateral sipes and the second middle lateral sipes provided in the middle land portion on the other side of the tire equator.

In the heavy duty tire according to the present invention, it is desirable that the first middle lateral sipes and the second middle lateral sipes provided in each of the middle land portions are parallel with each other.

In the heavy duty tire according to the present invention, it is desirable that the center main groove and the shoulder main groove on one side of the tire equator are shifted in the circumferential direction with respect to zigzag phase from the center main groove and the shoulder main groove on the other side of the tire equator.

In the heavy duty tire according to the present invention, it is preferable that the groove width of the shoulder main groove is larger than the groove width of the center main groove, the center land portion is provided with a plurality of center lateral sipes connecting between a pair of the center main grooves and inclined at an angle θ1 of 5 to 25 degrees with respect to the tire axial direction, each of the middle lateral sipes is inclined at an angle θ2 of 5 to 25 degrees with respect to the tire axial direction, and the angle θ1 of the center lateral sipes is larger than the angle θ2 of each of the middle lateral sipes.

In the heavy duty tire according to the present invention, it is desirable that the center lateral sipes include first center sipes connecting between the apex portions of the first groove edges of the center main grooves mostly protruding toward the tire equator, and second center sipes connecting between the apex portions of the first groove edges of the center main grooves mostly protruding toward the tread edges.

In the heavy duty tire according to the present invention, it is preferably that the middle lateral sipes respectively continue to the center lateral sipes through the center main grooves.

In the heavy duty tire according to the present invention, it is desirable for the center main grooves that the groove width at the apex portions mostly protruding toward the tread edge is larger than the groove width at the apex portions mostly protruding toward the tire equator.

In the heavy duty tire according to the present invention, it is desirable that the apex portions of the center main groove mostly protruding toward the tread edge is bent toward such direction that the second groove edge protrudes toward the outer side in the tire axial direction, and the first groove edge extends along the tire circumferential direction.

In the heavy duty tire according to the present invention, it is preferable that each of the center lateral sipes and each of the middle lateral sipes are linear.

In the heavy duty tire according to the present invention, it is preferable that the shoulder land portion is provided with a plurality of shoulder lateral sipes connecting between the shoulder main groove and the tread edge and inclined at an angle θ3 of 5 to 25 degrees with respect to the tire axial direction, and the inner ends in the tire axial direction of the shoulder lateral sipes are located between the apex portions mostly protruding toward the tire equator and the apex portions mostly protruding toward the tread edge, of the fourth groove edge of the shoulder main groove.

In the heavy duty tire according to the present invention, angles with respect to the tire axial direction of the middle lateral shallow grooves, the first middle lateral sipes and the second middle lateral sipes are preferably 5 to 20 degrees.

In the heavy duty tire according to the present invention, it is desirable that the respective numbers of the middle lateral shallow grooves, the first middle lateral sipes and the second middle lateral sipes provided in one of the middle land portions are 35 to 45.

In the heavy duty tire according to the present invention, the land ratio of the tread portion is preferably 70% to 85%.

EFFECT OF THE INVENTION

In the heavy duty tire according to the present invention, since the middle land portion is divided by the zigzag center main grooves, shoulder main grooves, the adjacent middle lateral shallow grooves and the adjacent first middle lateral sipes into the blocks of a hexagonal shape, the middle land portion has a high rigidity. Such tire has a small rolling resistance, and the middle land portion has excellent wear resistance.

In the present invention, the drainage performance of the middle land portion is increased by the middle lateral shallow grooves and the first middle lateral sipes. Further, the rigidity of the middle land portion is increased since the blocks adjacent to each other through the first middle lateral sipes contact and support each other. Thereby, movements of the blocks in the ground contacting patch are controlled, and uneven wear is suppressed.

BRIEF DESCRIPTION OF THE DRAWINGS

FIG. 9 a developed view of a tread portion of a pneumatic tire as Comparative Example.

MODE FOR CARRYING OUT THE INVENTION

Hereinafter, an embodiment of the present invention will be described with reference to the drawings.

Figure 1:
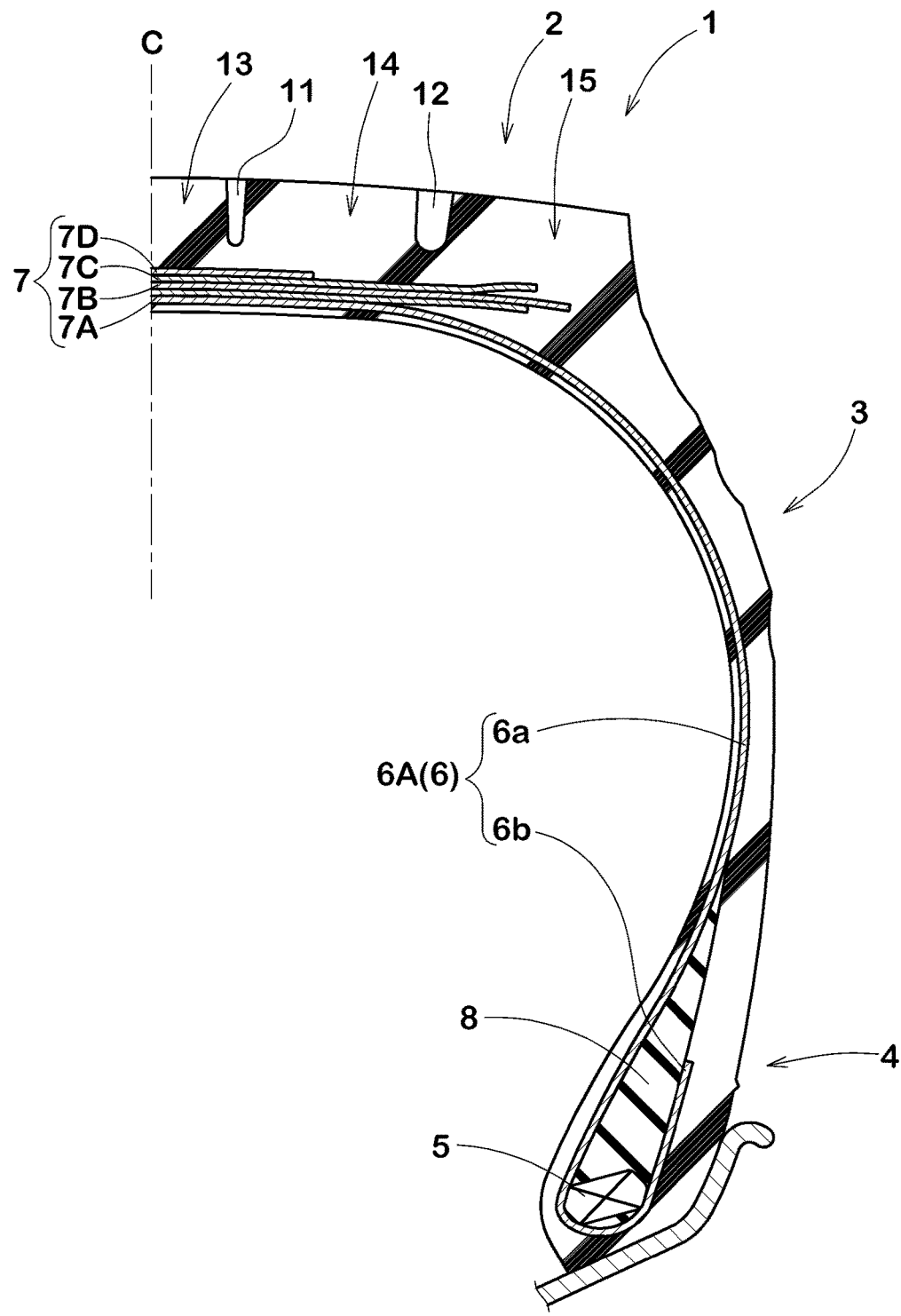
FIG. 1 a sectional view showing an embodiment of the heavy duty tire of the present invention.

FIG. 1 is a tire meridian cross sectional view of a heavy duty tire 1 of the present embodiment under the normal state, including the tire rotational axis.

Here, the normal state is a no-load state of the tire mounted on a normal rim (not shown) and filled to a standard internal pressure.

Hereinafter, if not specifically mentioned, dimensions of respective portions of the tire are values measured in the normal state.

The "normal rim" is a rim specified for each tire in a standardization system including a standard on which the tire is based, for example, the "normal wheel rim" in JATMA, "Design Rim" in TRA, and "measuring Rim" in ETRTO.

The "standard internal pressure" is an air pressure specified for each tire in a standardization system including a standard on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the heavy duty tire 1 of the present invention has a toroidal carcass 6 extending from a tread portion 2 to a bead core 5 in a bead portion 4 through a sidewall portion 3, a belt layer 7 disposed radially outside the carcass 6 in the tread portion 2 and the like.

In this embodiment, shown is a case where the heavy duty tire 1 is a tubeless tire to be mounted on a 15 degree tapered rim.

The carcass 6 is composed of a carcass ply 6A of carcass cords arranged at an angle of for example 80 to 90 degrees with respect to the tire equator C.

The carcass ply 6A has a ply turnup portion 6b folded back around the bead core 5 from the inside to the outside in the tire axial direction at each end of a ply main portion 6a extending between the bead cores 5, 5, in series therewith. Between the ply main portion 6a and the ply turnup portion 6b, there is disposed a triangular bead apex rubber 8 extending radially outwardly from the bead core 5.

The belt layer 7 is disposed radially outside the carcass 6 in the tread portion 2. The belt layer 7 is constituted by a plurality of belt plies using a steel belt cord. The belt layer 7 in the present embodiment include four layers, an innermost belt ply 7A of belt cords arranged at an angle of approximately 60+/−10 degrees with respect to the tire equator C for example, and belt plies 7B, 7C and 7D disposed on the outside thereof in series and composed of belt cords arranged at small angles of about 15 to 35 degrees with respect to the tire equator C. By being provided with at least one position where belt cords intersect each other between the plies, the belt layer 7 increases belt rigidity, and firmly reinforce an approximately entire width of the tread portion 2.

The bead core 5 has a landscape-oriented flat hexagonal cross sectional shape, and the radially inner surface thereof is inclined at an angle of 12 to 18 degrees with respect to the tire axial direction to increase the fitting force to a rim over a wide range.

Figure 2:
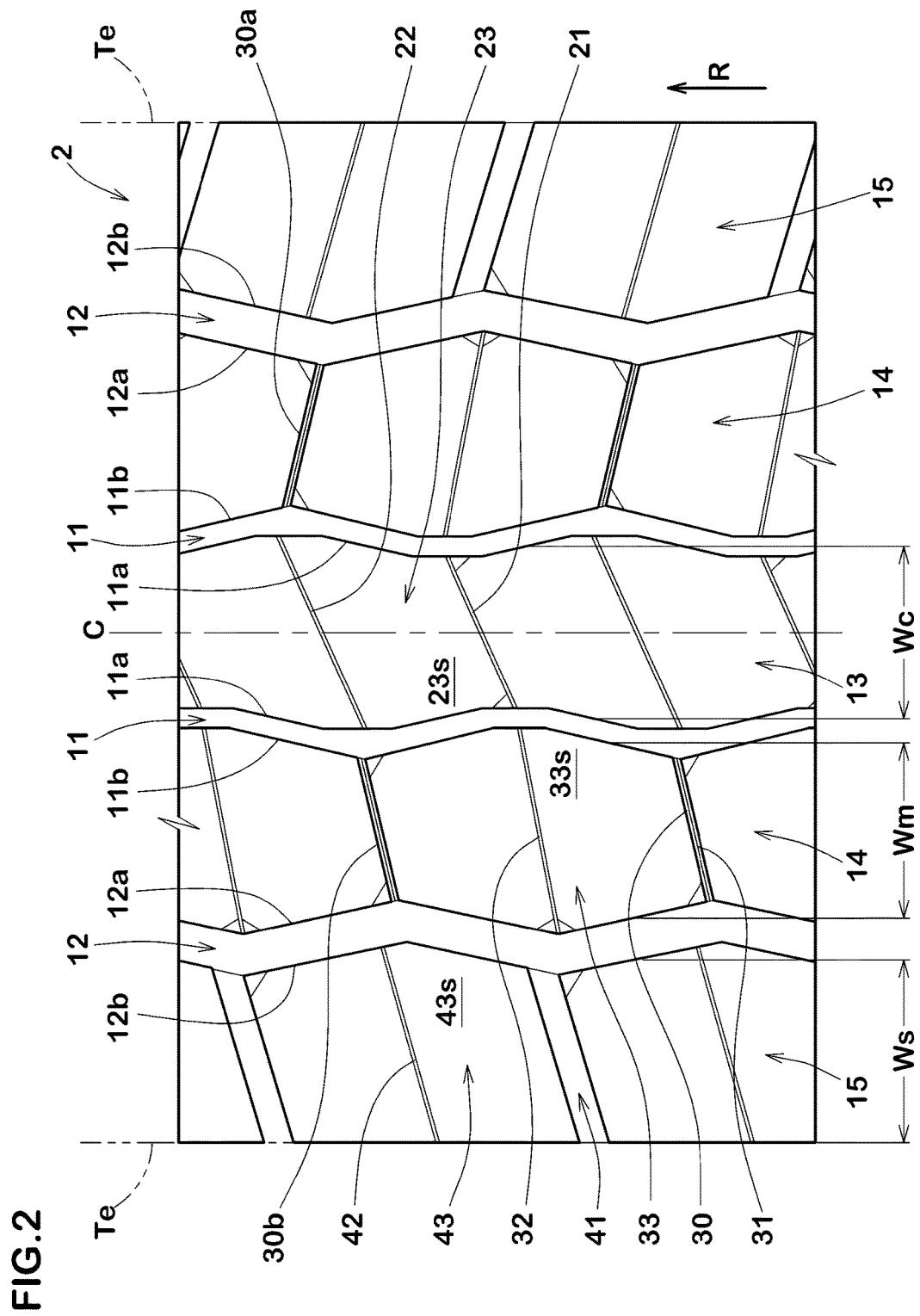
FIG. 2 a developed view of a tread portion in FIG. 1.
Figure 3:
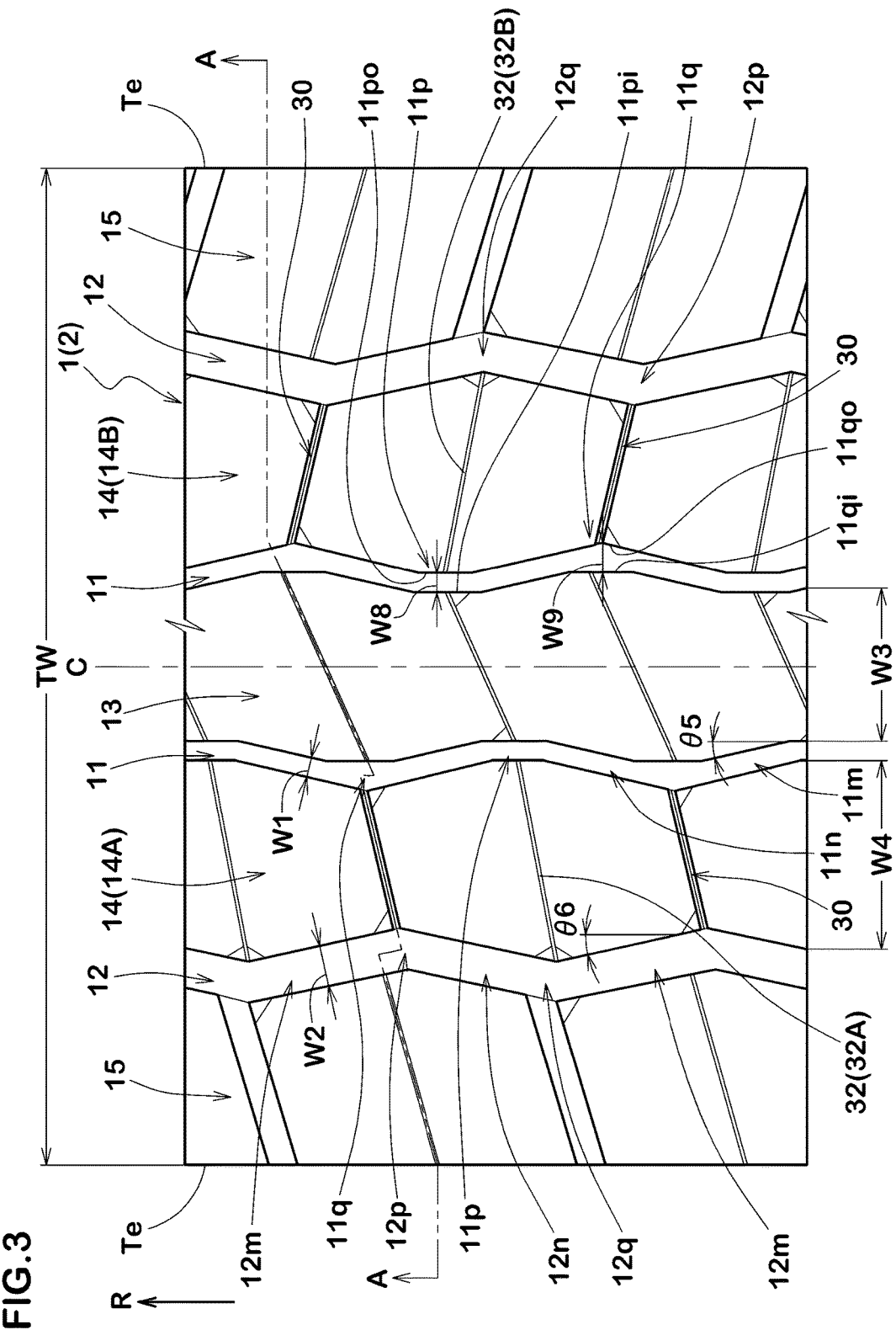
FIG. 3 a developed view of a tread portion in FIG. 1.

FIGS. 2 and 3 are a developed view of the tread portion 2 of the heavy duty tire 1 of the present embodiment. As shown in FIG. 2, the heavy duty tire 1 of the present embodiment is provided in the tread portion 2 with a directional pattern in which a rotational direction R of the tire is specified. The rotational direction R is indicated, for example, in the sidewall portion 3 or the like by letters or marks.

The tread portion 2 is provided with
a pair of center main grooves 11 disposed on both sides of the tire equator C, and extending continuously in the tire circumferential direction in a zigzag shape, and
a pair of shoulder main grooves 12 disposed on the outer sides of the center main grooves 11 in the tire axial direction and on the inner sides of the tread edges Te and extending continuously in the tire circumferential direction in a zigzag shape.

The zigzag pitches of the shoulder main grooves 12 are equal to the zigzag pitches of the center main grooves 11.

The groove depth of the shoulder main grooves 12 is equal to the groove depth of the center main grooves 11.

The zigzag phase of the center main groove 11 on one side of the tire equator C is shifted in the circumferential direction from that of the center main groove 11 on the other side.

Similarly, the zigzag phase of the shoulder main groove 12 on one side of the tire equator C is shifted in the circumferential direction from that of the shoulder main groove 12 on the other side.

The zigzag phase of the center main groove 11 is shifted in the circumferential direction from that of the adjacent shoulder main groove 12, The tread edge Te means the axially outermost ground contacting edge when the tire under the normal state is contacted with a plane at an camber angle of 0 degree by applying the normal load.

The "normal load" is a load specified for each tire in a standardization system including a standard on which the tire is based, the "maximum load capacity" in JATMA, maximum value listed in "TIRE LOAD LIMITS AT VARIOUS COLD INFLATION PRESSURES" table in TRA, and "LOAD CAPACITY" in ETRTO.

By the center main grooves 11 and the shoulder main grooves 12, the tread portion 2 is divided into a plurality of regions.

The tread portion 2 has
a center land portion 13 between the center main groove 11 on one side of the tire equator C and the center main groove 11 on the other side,
a pair of middle land portion 14 between the center main grooves 11 and the shoulder main grooves 12, and
a pair of shoulder land portions 15 positioned axially outside the shoulder main grooves 12.

In other words, on both sides of the center main groove 11, the center land portion 13 and the middle land portion 14 are provided. On both sides of the shoulder main grooves 12, the middle land portion 14 and the shoulder land portion 15 are provided.

It is desirable that the ratio Wc:Wm:Ws of the average width Wc in the tire axial direction of the center land portion 13, the average width Wm in the tire axial direction of the middle land portion 14, and the average width Ws in the tire axial direction of the shoulder land portion 15 is 1.00:1.00 to 1.08:1.03 to 1.13.

If the ratio Wm/Wc of the average width Wm of the tire axial direction of the middle land portion 14 and the average width Wc in the tire axial direction of the center land portion 13 is less than 1.00, and the ratio Ws/Wc of the average width Ws in the tire axial direction of the shoulder land portion 15 and the average width Wc in the tire axial direction of the center land portion 13 is less than 1.08, then the ground contact pressure of the center land portion 13 becomes excessively high, and there is a possibility that uneven wear occurs in the center land portion 13.

If the ratio Wm/Wc of the average width Wm in the tire axial direction of the middle land portion 14 and the average width Wc in the tire axial direction of the center land portion 13 is more than 1.03, and the ratio Ws/Wc of the average width Ws in the tire axial direction of the shoulder land portion 15 and the average width Wc in the tire axial direction of the center land portion 13 is more than 1.13, then the ground contact pressure of the middle land portions 14 and the shoulder land portions 15 becomes excessively high, and it becomes difficult to decrease the rolling resistance of the tire.

As shown in FIG. 3, each of the center main grooves 11 is zigzag such that first apex portions 11p protruding toward the tire equator C and second apex portions 11q protruding toward the tread edge Te appear alternately in the tire circumferential direction.

In the first apex portion 11p, for example, an axially outer edge 11po and an axially inner edge 11pi extend linearly along the tire circumferential direction. On the other hand, in the second apex portion 11q, an axially outer groove edge 11qo is bent so as to protrude toward the outside in the tire axial direction, and an axially inner groove edge 11qi extends straight along the tire circumferential direction.

It is desirable that the groove width W9 in the second apex portion 11q is larger than, for example, the groove width W8 in the first apex portion 11p.

Such center main groove 11 makes smooth the water flow in the groove from the first apex portion 11p toward the second apex portion 11q and improves the wet performance.

A pair of the center main grooves 11, 11 are arranged by shifting their zigzag phases from each other so that the axial width of the center land portion 13 repeats increase and decrease in the tire circumferential direction.

As shown in FIG. 2, the center main groove 11 has a first groove edge 11a on the tire equator C side and a second groove edge 11b on the tread edge Te side.

As shown in FIG. 3, the first groove edge 11a has the above-mentioned edge 11pi and the above-mentioned groove edge 11qi. The second groove edge 11b has the above-mentioned edge 11po and the above-mentioned groove edge 11qo.

The tread width TW is the distance in the tire axial direction between the tread edges Te, Te under the normal state.

The groove width W1 of the center main groove 11 is, for example, 1.5 to 3.0% of the tread width TW.

Such center main groove 11 exhibits excellent wet performance, while increasing the rigidity of the tread near the center.

The center main groove 11 includes first groove portions 11m inclined to one side with respect to the tire circumferential direction and second groove portions 11n inclined to the opposite direction to the first groove portions 11m.

The angles θ5 of the first groove portions 11m and the second groove portions 11n with respect to the tire circumferential direction are, for example, 5 to 25 degrees. Such center main groove 11 exerts, at the time of wet running, edge effect in the tire axial direction and the tire circumferential direction in good balance.

Figure 4:
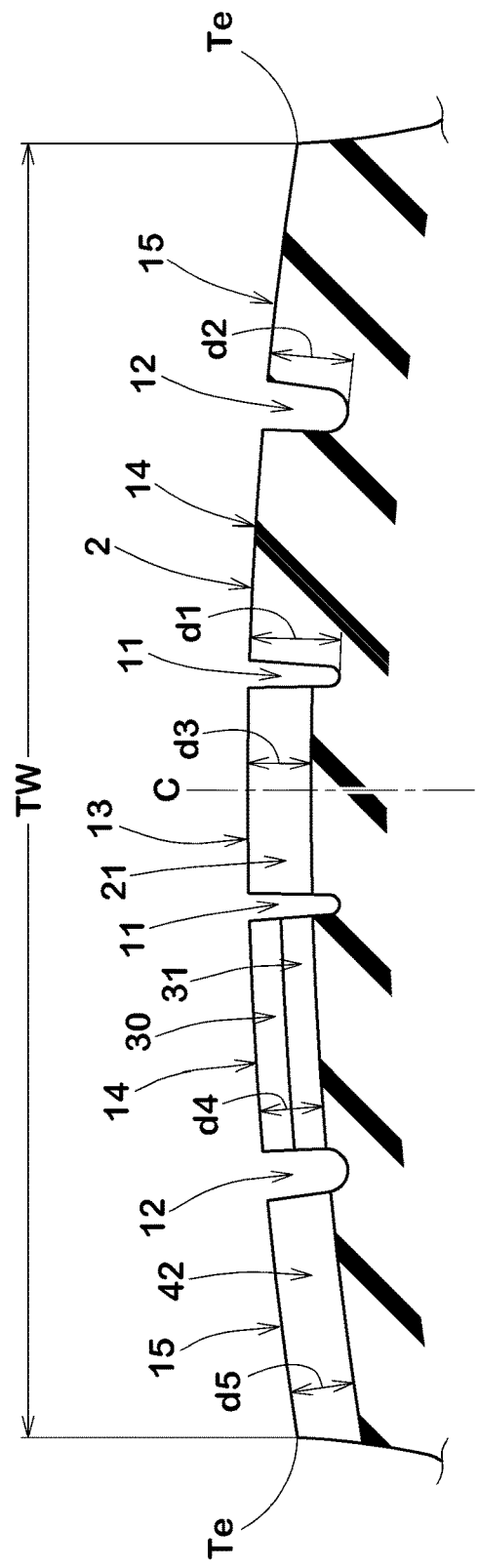
FIG. 4 an A-A section of FIG. 3.

In FIG. 4, there is shown A-A cross section of the tread portion 2 in FIG. 3. As shown in FIG. 4, the groove depth d1 of the center main groove 11 is, for example, 8 to 25 mm.

The shoulder main groove 12 is a zigzag shape such that first apex portions 12p protruding toward the tire equator C and second apex portions 12q protruding toward the tread edge Te appear alternately in the tire circumferential direction.

The shoulder main groove 12 is arranged by shifting the zigzag phase from the center main groove 11 so that the axial width of each middle land portion 14 repeats increase and decrease in the tire circumferential direction.

The groove width W2 of the shoulder main groove 12 is larger than the groove width W1 of the center main groove 11.

Thus, the middle land portion 14 is shifted toward the center land portion 13, and the land ratio is increased in the vicinity of the tread center portion subjected to larger load. Therefore, the contact pressure of each of the center land portion 13 and the middle land portions 14 is decreased, and their wear is reduced.

On the other hand, when the land ratio is increased in the vicinity of the tread center portion, there is a possibility that wet performance is deteriorated in such area.

In the present invention, the center main grooves 11 and the shoulder main grooves 12 are zigzag, and their substantial lengths in the ground contacting patch are greater than that of a straight groove along the tire circumferential direction. Moreover, such center main groove and shoulder main grooves exert edge effect in the tire axial direction as well as the tire circumferential direction. Therefore, in the tire of the present invention, wet performance in the vicinity of the tread center portion is effectively maintained, while having the center main groove 11 of a small groove width, In order to further improve the wet performance and wear resistance in good balance, the ratio W2/W1 of the groove width W2 of the shoulder main groove 12 and the groove width W1 of the center main groove 11 is preferably 1.8 or more, more preferably 2.0 or more, and preferably 2.6 or less, more preferably 2.4 or less.

If the center land portion 13 and the middle land portions 14 extend continuously in the tire circumferential direction with a substantially constant width, then, when contacting with the ground, as the land portion has no escape in the tire circumferential direction, the deformation in the tire axial direction increases. Accordingly, the treads of the center land portion 13 and the middle land portions 14 are partly deformed when contacting the ground, and there is a possibility that uneven wear occurs near the edges of the land portions.

In the present invention, the center main grooves 11 and the shoulder main grooves 12 are arranged by shifting their zigzag phases so that the axial widths of the center land portion 13 and the middle land portions 14 repeat increase and decrease in the tire circumferential direction. Therefore, when the tread of each land portion contacts with the ground, since the part having a smaller width bends moderately, partial strain of the tread when contacting with the ground can be effectively suppressed, and uneven wear of the land portion is suppressed.

As shown in FIG. 2, the shoulder main groove 12 has a third groove edge 12a on the tire equator C side, and a fourth groove edge 12b on the tread edge Te side.

As shown in FIG. 3, the shoulder main groove 12 includes first groove portions 12m inclined to one side with respect to the tire circumferential direction, and second groove portions 12n inclined to the opposite direction to the first groove portions 12m.

The angles θ6 of the first groove portions 12m and the second groove portions 12n with respect to the tire circumferential direction are, for example, 5 to 25 degrees.

Such shoulder main groove 12 exerts edge effect in the tire circumferential direction and the tire axial direction in good balance.

As shown in FIG. 3, the groove depth d2 of the shoulder main grooves 12 is, for example, 8 to 25 mm.

Figure 5:
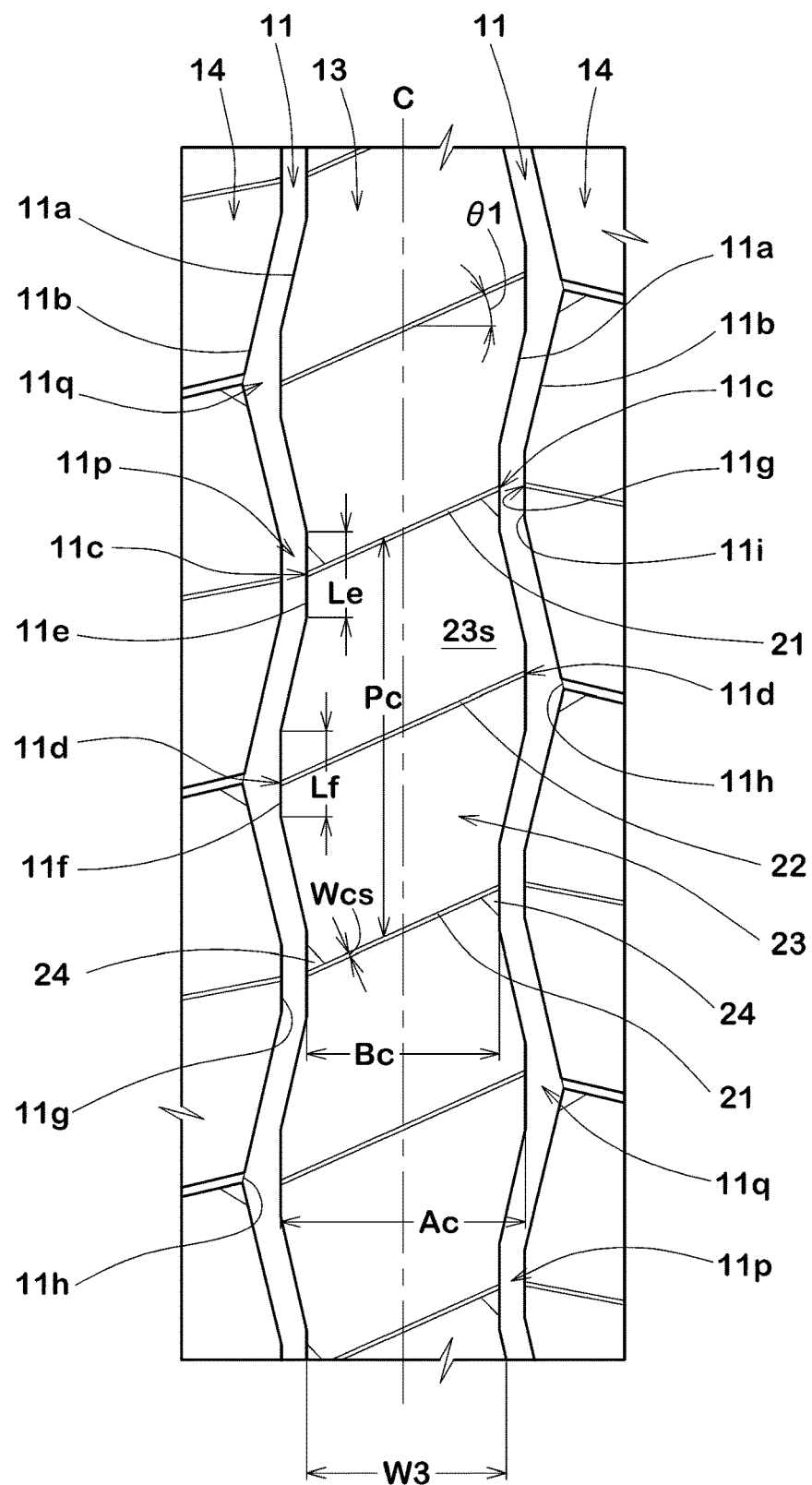
FIG. 5 an enlarged developed view of the crown land portion in FIG. 2.

In FIG. 5, there is shown an enlarged view of the center main grooves 11 and the center land portion 13.

The first groove edge 11a of the center main groove 11 has first apex portions 11c mostly protruding toward the tire equator C and second apex portions 11d mostly protruding toward the tread edge Te.

In the present embodiment, the first apex portions 11c are formed by longitudinal groove edges 11e extending along the tire circumferential direction, and
the second apex portions 11d are formed by longitudinal edges 11f extending along the tire circumferential direction. That is, the first apex portions 11c and the second apex portions 11d are formed by regions of the first groove edge 11a continuous along the tire circumferential direction.

The longitudinal groove edges 11e and the longitudinal edges 11f may be omitted. In such case, the zigzag vertices of the first groove edge 11a are the first apex portions 11c and the second apex portions 11d.

The second groove edge 11b of the center main groove 11 has first apex portions 11g mostly protruding toward the tire equator C and second apex portions 11h mostly protruding toward the tread edge Te.

The first apex portion 11g in this embodiment is formed by a longitudinal groove edge 11i extending along the tire circumferential direction.

That is, the first apex portion 11g is formed by a region of the second groove edge 11b which region is continuous along the tire circumferential direction.

The longitudinal groove edges 11i may be omitted. In such case, the zigzag apexes of the first groove edge 11a protruding toward the tire equator C are the first apex portions 11g.

By the longitudinal groove edges 11e, 11f and the 11i, water is easily discharged toward the tire circumferential direction, and the drainage performance of the tread portion 2 is improved.

The distance W3 in the tire axial direction of the center land portion 13 is 0.15 to 0.25 times the tread width TW (shown in FIG. 3) for example. Such center land portion 13 enhances wet performance and wear resistance in good balance.

The center land portion 13 is provided with a plurality of first center lateral sipes 21 and a plurality of second center lateral sipes 22.

In this specification, the term "sipe" means a cut whose width is for example 0.5 to 1.0 mm, and is distinguished from a groove for drainage.

The center land portion 13 in this embodiment is formed as a so-called rib not provided with lateral grooves having a groove width larger than the sipes.

The first center lateral sipes 21 and a plurality of the second center lateral sipes 22 are, for example, extended straight, while inclining at an angle θ1 of 5 to 25 degrees with respect to the tire axial direction. Such center lateral sipes 21 and 22 provide excellent edge effect in the tire circumferential direction, and enhance the wet performance.

As shown in FIG. 4, the depth d3 of the first center lateral sipe 21 is, for example, 0.7 to 0.9 times the groove depth d1 of the center main grooves 11. Such first center lateral sipes 21 enhance the wear resistance and the wet performance in good balance.

The depth of the second center lateral sipe 22 is also the same as this.

The first center lateral sipes 21 and the second center lateral sipes 22 extend in the tire axial direction to connect between the center main groove 11 on one side of the tire equator C and the center main groove 11 on the other side of the tire equator C.

The first center lateral sipes 21 connect between the first apex portions 11c of the first groove edge 11a on one side of the tire equator C and the first apex portions 11c of the first groove edge 11a on the other side.

The second center lateral sipes 22 connect between the second apex portions 11d of the first groove edge 11a on one side of the tire equator C and the second apex portions 11d of the first groove edge 11a on the other side.

The first center lateral sipes 21 and the second center lateral sipes 22 are disposed alternately in the tire circumferential direction.

The center land portion 13 is a block row in which a plurality of center blocks 23 divided by the first center lateral sipes 21 and the second center lateral sipes 22 are arranged.

The ratio Le/Pc of the length Le in the tire circumferential direction of the longitudinal groove edge 11e and the distance Pc between the circumferentially adjacent first center lateral sipes 21, 21 is preferably 0.1 to 0.4.

If the ratio Le/Pc is less than 0.1, the rigidity of the first apex portions 11c of the center block 23 is reduced locally, and the first apex portions 11c become starting points of uneven wear. If the ratio Le/Pc is more than 0.4, the rigidity of the entire center block 23 is decreased and it becomes difficult to reduce the rolling resistance of the tire.

Similarly to the above, the ratio Lf/Pc of the length Lf in the tire circumferential direction of the longitudinal edge 11f and the distance Pc between the circumferentially adjacent first center lateral sipes 21, 21 is preferably 0.1 to 0.4.

The ratio Wcs/PC of the width Wcs of the first center lateral sipe 21 and the distance Pc between the circumferentially adjacent first center lateral sipes 21, 21 is preferably 0.1 or less, more preferably 0.05 or less.

If the ratio Wcs/Pc is more than 0.1, since the contact area between the side walls of the adjacent center blocks 23 is decreased, it becomes difficult to obtain such effect that the adjacent center blocks 23 support each other to increase the rigidity.

The second center lateral sipes 22 are disposed parallel with the first center lateral sipes 21. By such second center lateral sipes 22, the rigidity distribution of the center blocks 23 is optimized, and the wet performance of the center land portion 13 is enhanced.

In this embodiment, since the zigzag phase of the center main groove 11 on one side of the tire equator C is shifted in the circumferential direction from that of the center main groove 11 on the other side, the first center lateral sipes 21 and the second center lateral sipes 22 are inclined with respect to the tire axial direction, and drainage performance of the center land portion 13 is enhanced.

The depths of the first center lateral sipes 21 and the second center lateral sipes 22 are preferably 50% to 80%, more preferably from 65% to 75% of the depth of the center main groove 11.

If the depth of the first center lateral sipes 21 is less than 50% of the depth of the center main groove 11, although high rigidity of a block alone can be obtained, since the contact area between the side walls of the adjacent blocks is reduced, it becomes difficult to obtain the function to increase the rigidity by making the adjacent blocks to support each other. Therefore, the rigidity of the entire center land portion 13 is decreased, and it becomes difficult to reduce the rolling resistance of the tire.

On the other hand, if the depth of the first center lateral sipe 21 exceeds 80% of the depth of the center main groove 11, the rigidity of each block alone is significantly decreased, and it becomes difficult to reduce the rolling resistance of the tire.

Chamfered portions 24 are formed at acute angled vertices of the block vertices where the first center lateral sipes 21 intersect the center main grooves 11. The chamfered portion 24 mitigates stress concentration at the block vertex, and prevents damage such as chipping.

Instead of the chamfered portion 24, a rounded corner portion may be formed.

The ratio Bc/Ac of
the length in the tire axial direction between the second apex portions 11d of the first groove edge 11a on one side of the tire equator C, and the second apex portions 11d of the first groove edge 11a on the other side (ie, the length in the tire axial direction of the second center lateral sipes 22) Ac, and
the length in the tire axial direction between the first apex portions 11c of the first groove edge 11a on one side and the first apex portions 11c of the first groove edge 11a on the other side (ie, the length in the tire axial direction of the first center lateral sipes 21) Bc
is preferably 0.75 to 0.85, more preferably from 0.77 to 0.82.

If the ratio Bc/Ac is less than 0.75, the rigidity of the center land portion 13 is decreased, and it becomes difficult to reduce the rolling resistance of the tire. On the other hand, if the ratio Bc/Ac is more than 0.85, there is a possibility that the drainage performance of the center main groove 11 is reduced.

Figure 6:
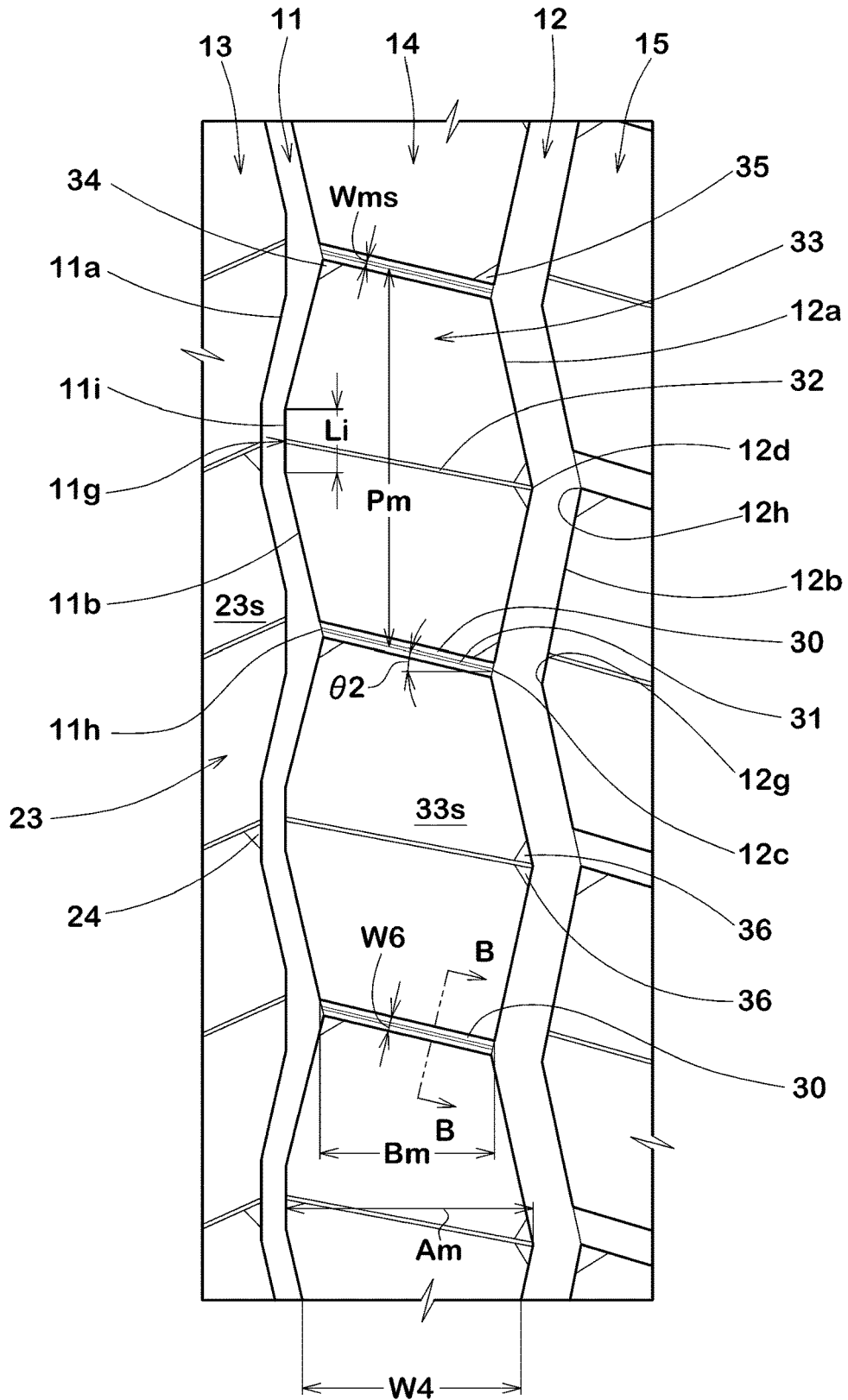
FIG. 6 an enlarged developed view of the middle land portion in FIG. 2.

In FIG. 6, there is shown an enlarged view of the center main grooves 11, the middle land portion 14 and the shoulder main grooves 12.

The third groove edge 12a of the shoulder main groove 12 has first apex portions 12c mostly protruding toward the tire equator and second apex portions 12d mostly protruding toward the tread edge Te.

The fourth groove edge 12b of the shoulder main groove 12 has first apex portions 12g mostly protruding toward the tire equator and second apex portions 12h mostly protruding toward the tread edge Te.

The tire axial distance W4 of the middle land portion 14 is, for example, 0.15 to 0.25 times the tread width TW. Such middle land portion 14 enhances the wet performance and wear resistance in good balance.

The middle land portion 14 is provided with a plurality of middle lateral shallow grooves 30, a plurality of first middle lateral sipes 31 and a plurality of second middle lateral sipes 32.

The middle lateral shallow grooves 30, the first middle lateral sipes 31 and the second middle lateral sipes 32 extend in the tire axial direction and connect between the center main groove 11 and the shoulder main groove 12.

The groove width W6 of the middle lateral shallow grooves 30 is, for example, 0.30 to 0.45 times the groove width W1 of the center main grooves 11.

The middle lateral shallow grooves 30 connect between the second apex portions 11h of the second groove edge 11b of the center main groove 11 and the first apex portions 12c of the third groove edge 12a of the shoulder main groove 12. Therefore, the middle land portion 14 is a block row in which a plurality of middle blocks 33 are arranged.

By the zigzag center main groove 11 and shoulder main groove 12 and the adjacent middle lateral shallow grooves 30, 30, the tread 33s of the middle block 33 in this embodiment is substantially hexagonal.

In the present embodiment, the adjacent center main groove 11 and shoulder main groove 12 are shifted with respect to the zigzag phases in the rotational direction R of the tire. Thus, as shown in FIG. 2, the middle lateral shallow groove 30a on one side of the tire equator C and the middle lateral shallow groove 30b on the other side are different from each other in the orientation with respect to the tire axial direction.

The tread portion 2 is provided with a directional pattern having a specified rotational direction R.

The middle lateral shallow grooves 30, the first middle lateral sipes 31 and the second middle lateral sipes 32 extend straight and inclined at an angle θ2 of 5 to 25 degrees with respect to the tire axial direction. Such first middle lateral sipes 31 and second middle lateral sipes 32 exert excellent edge effect in the tire circumferential direction, and enhance the wet performance.

If importance is to be attached to the reduction of the rolling resistance, it is preferable that the angles θ2 of the middle lateral shallow grooves 30, the first middle lateral sipes 31 and the second middle lateral sipes 32 are 5 to 20 degrees with respect to the tire axial direction.

If the angle θ2 is less than 5 degrees, there is a possibility that the drainage performance of the middle land portion 14 is reduced. On the other hand, if the angle θ2 exceeds 20 degrees, the rigidity of the middle land portion 14 decreases, and it becomes difficult to reduce the rolling resistance of the tire.

The angle of the middle lateral shallow grooves 30 with respect to the tire axial direction, the angle of the first middle lateral sipes 31 with respect to the tire axial direction, and the angle of the second middle lateral sipes 32 with respect to the tire axial direction may differ within the above range, The angles θ1 of the center lateral sipes 21 and 22 (shown in FIG. 3, the same applied below) are greater than the angles θ2.

In general, it is effective for uniform wear to make the wear of the center land portion 13 where the ground contact pressure is high, closer to the wear of the middle land portion 14.

Since the center land portion 13 is subjected to higher ground contact pressure than the middle land portion 14, it is important to relatively increase the wear resistance of the center land portion 13.

In the present invention, the angles θ1 of the center lateral sipes 21 and 22 are more than the angles θ2 of the first middle lateral sipes 31 and the second middle lateral sipes 32. Therefore, with respect to force in either direction, the tire circumferential direction or tire axial direction, land pieces which are divided by the center lateral sipes 21 and 22 contact and support each other. Accordingly, the rigidity of the center land portion 13 is increased, the wear becomes uniform between the center land portion 13 and the middle land portion 14.

It is desirable that the depth of the middle lateral shallow grooves 30 is 10% to 30% of the depth of the center main grooves 11.

If the depth of the middle lateral shallow grooves 30 is less than 10% of the depth of the center main grooves 11, there is a possibility that the drainage performance of the middle land portion 14 is deteriorated.

On the other hand, if the depth of the middle lateral shallow grooves 30 is more than 30% of the depth of the center main grooves 11, since the contact area between the side walls of the adjacent blocks is reduced, it becomes difficult to obtain the effect such that the adjacent blocks support each other to increase the rigidity. Therefore, the rigidity of the entire middle land portion 14 is decreased, and it becomes difficult to reduce the rolling resistance of the tire.

If the middle land portion 14 is provided with sufficient drainage performance by the first middle lateral sipes 31 and the second middle lateral sipes 32, then the middle lateral shallow grooves 30 may be omitted.

The first middle lateral sipes 31 and the second middle lateral sipes 32 can effectively suppress partial strain of the tread when contacting with the ground.

The first middle lateral sipe 31 is formed in the groove bottom of each of the middle lateral shallow grooves 30.

Along each of the middle lateral shallow grooves 30, the first middle lateral sipe 31 connects between the second apex portion 11h of the second groove edge 11b of the center main groove 11 and the first apex portion 12c of the third groove edge 12a of the shoulder main groove 12.

Figure 7:
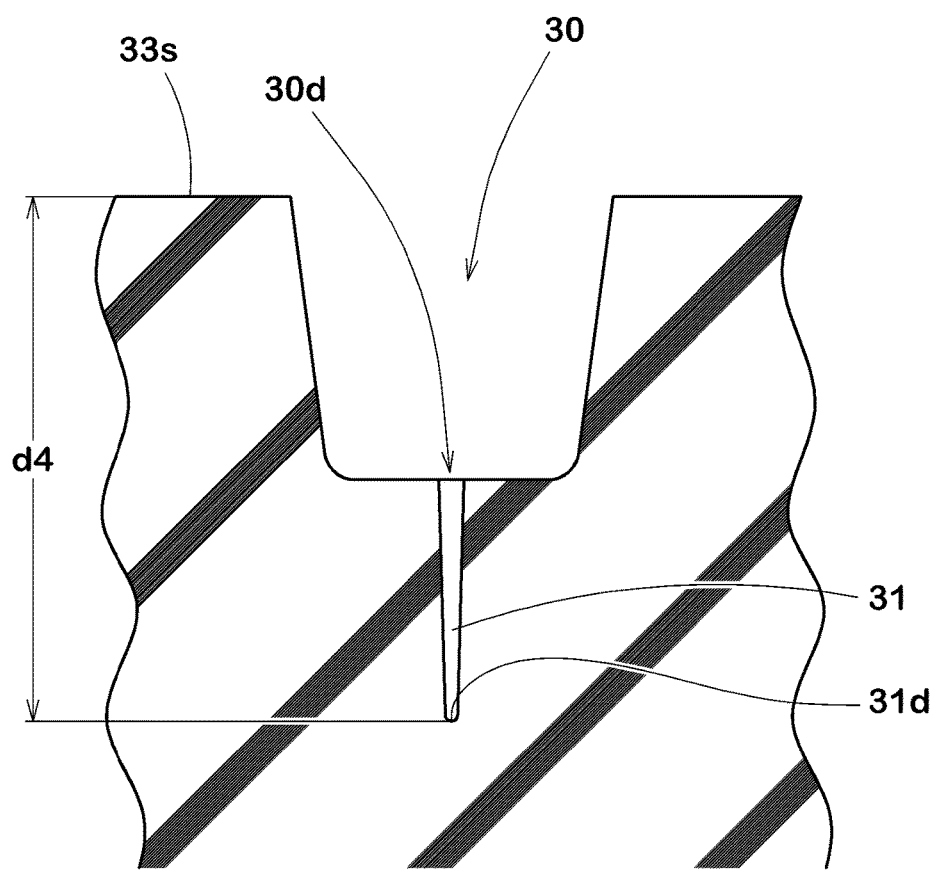
FIG. 7 a B-B section of the first middle lateral sipe in FIG. 7.

In FIG. 7, there is shown B-B cross section of the first middle lateral sipe 31 in FIG. 6. As shown in FIG. 5, the first middle lateral sipe 31 is disposed in the groove bottom 30d of the middle lateral shallow groove 30. Such first middle lateral sipes 31 compensate for the drainage of the middle lateral shallow grooves 30, and can further improve the wet performance.

The depth d4 from the tread 33s to the bottom 31d of the first middle lateral sipe 31 (ie, the sum of the groove depth of the middle lateral shallow groove 30 and the depth of the first middle lateral sipe 31) is, for example, preferably 70% to 90%, more preferably from 75% to 85% of the groove depth d1 (shown in FIG. 4) of the center main groove 11. As a result, the wear resistance and wet performance are enhanced in good balance.

If importance is to be attached to the reduction of the rolling resistance, the depth d4 from the tread 33s to the bottom 31d of the first middle lateral sipe 31, and the depth of the second middle lateral sipe 32 are preferably 50% to 80%, more preferably from 65% to 75% of the depth d1 of the center main grooves 11.

If the depth of the first middle lateral sipe 31 and the like is less than 50% of the depth of the center main grooves 11, although high rigidity of a block alone can be obtained, since the contact area between the side walls of the adjacent blocks is reduced, it becomes difficult to obtain the function to increase the rigidity by making the adjacent blocks to support each other. Therefore, the rigidity of the entire middle land portion 14 is decreased, and it becomes difficult to reduce the rolling resistance of the tire.

On the other hand, if the depth of the first middle lateral sipe 31 and the like exceeds 80% of the depth of the center main groove 11, then the rigidity of each block alone significantly decreased, and it becomes difficult to reduce the rolling resistance of the tire.

As shown in FIG. 6, it is desirable that the ratio Li/Pm of the length Li in the tire circumferential direction of the longitudinal edge 11i and the distance Pm between the circumferentially adjacent first middle lateral sipes 31 and 31 is 0.1 to 0.4.

If the ratio Li/Pm is less than 0.1, the rigidity of the first apex portion 11g of the middle block 33 is reduced locally, and the first apex portions 11g tends to become a starting point of uneven wear.

If the ratio Li/Pm exceeds 0.4, the rigidity of the whole middle blocks 33 is reduced, and it becomes difficult to reduce the rolling resistance of the tire.

The ratio Wms/Pm of the width Wms of the first middle lateral sipe 31 and the distance Pm between the circumferentially adjacent first middle lateral sipes 31 and 31 is preferably 0.1 or less, more preferably 0.05 or less.

If the ratio Wms/Pm exceeds 0.1, since the contact area between the side walls of the adjacent middle blocks 33 decreases, it becomes difficult to obtain the effect such that the adjacent middle blocks 33 support each other to enhance the rigidity.

The second middle lateral Sipe 32 connects between
the first apex portion 11g of the second groove edge 11b of the center main groove 11 and
the second apex portion 12d of the third groove edge 12a of the shoulder main groove 12.

The second middle lateral sipes 32 are disposed parallel with the first middle lateral sipes 31, and the tread surface 33s of the middle block 33 is divided into two.

By such second middle lateral sipes 32, the rigidity distribution of the middle blocks 33 is optimized, and the wet performance of the middle land portion 14 is enhanced.

Chamfered portions 34 are formed at acute angled vertices of block vertices where the middle lateral shallow grooves 30 intersect the center main grooves 11.

Chamfered portions 35 are formed at acute angled vertices of block vertices where the middle lateral shallow grooves 30 intersect the shoulder main groove 12.

Chamfered portions 36 are formed at acute angled vertices of block vertices where the second middle lateral sipes 32 intersect the shoulder main grooves 12.

The chamfered portions 34, 35 and 36 mitigate stress concentration on the block vertices, and suppress damage such as chipping.

Instead of the chamfered portions 34, 35 and 36, a rounded corner portion may be formed.

The ratio Bm/Am of
the length in the tire axial direction between the first apex portions 11g of the second groove edge 11b of the center main groove 11 and the second apex portions 12d of the third groove edge 12a of the shoulder main grooves 12 (ie, the length in the tire axial direction of the second middle lateral sipe 32) Am, and
the length in the tire axial direction between the second apex portions 11h of the second groove edge 11b and the first apex portions 12c of the third groove edge 12a (ie, the length in the tire axial direction of the first middle lateral sipe 31) Bm is preferably 0.75 to 0.85, more preferably from 0.77 to 0.82.

If the ratio Bm/Am is smaller than 0.75, the rigidity of the center land portion 13 decreases, and it becomes difficult to reduce the rolling resistance of the tire.

On the other hand, if the ratio Bm/Am is greater than 0.85, there is a possibility that the drainage performance of the center main grooves 11 and the shoulder main grooves 12 is reduced.

As shown in FIG. 3, the second middle lateral sipes 32A provided in the middle land portion 14A on the left side of the tire equator C and the second middle lateral sipes 32B provided in the middle land portion 14B on the right side of the tire equator C are inclined in opposite directions to each other. Such second middle lateral sipes 32 exert edge effect equally on both sides in the tire axial direction. Moreover, during running in wet condition, such second middle lateral sipes 32 guide the water existing between the middle land portion 14 and the road surface toward both sides in the tire axial direction. Therefore, straight running stability during wet running is enhanced in particular.

Also for the first middle lateral sipe 31, it is the same as described above.

Each of the middle lateral sipes 31 and 32 is, for example, inclined to the outside in the tire axial direction toward the later contacting side from the prior contacting side in the rotational direction R of the tire. Such middle lateral sipes 31, 32 further enhance the wet performance.

Each of the numbers of the middle lateral shallow grooves 30, the first middle lateral sipes 31 and the second middle lateral sipes 32 disposed in one middle land portion 14, is preferably 35 to 45, more preferably 38 to 42.

If each number is less than 35, there is a possibility that the drainage performance of the middle land portion 14 is deteriorated. On the other hand, if each number is more than 45, the rigidity of the middle land portion 14 is decreased, and it becomes difficult to reduce the rolling resistance of the tire.

Figure 8:
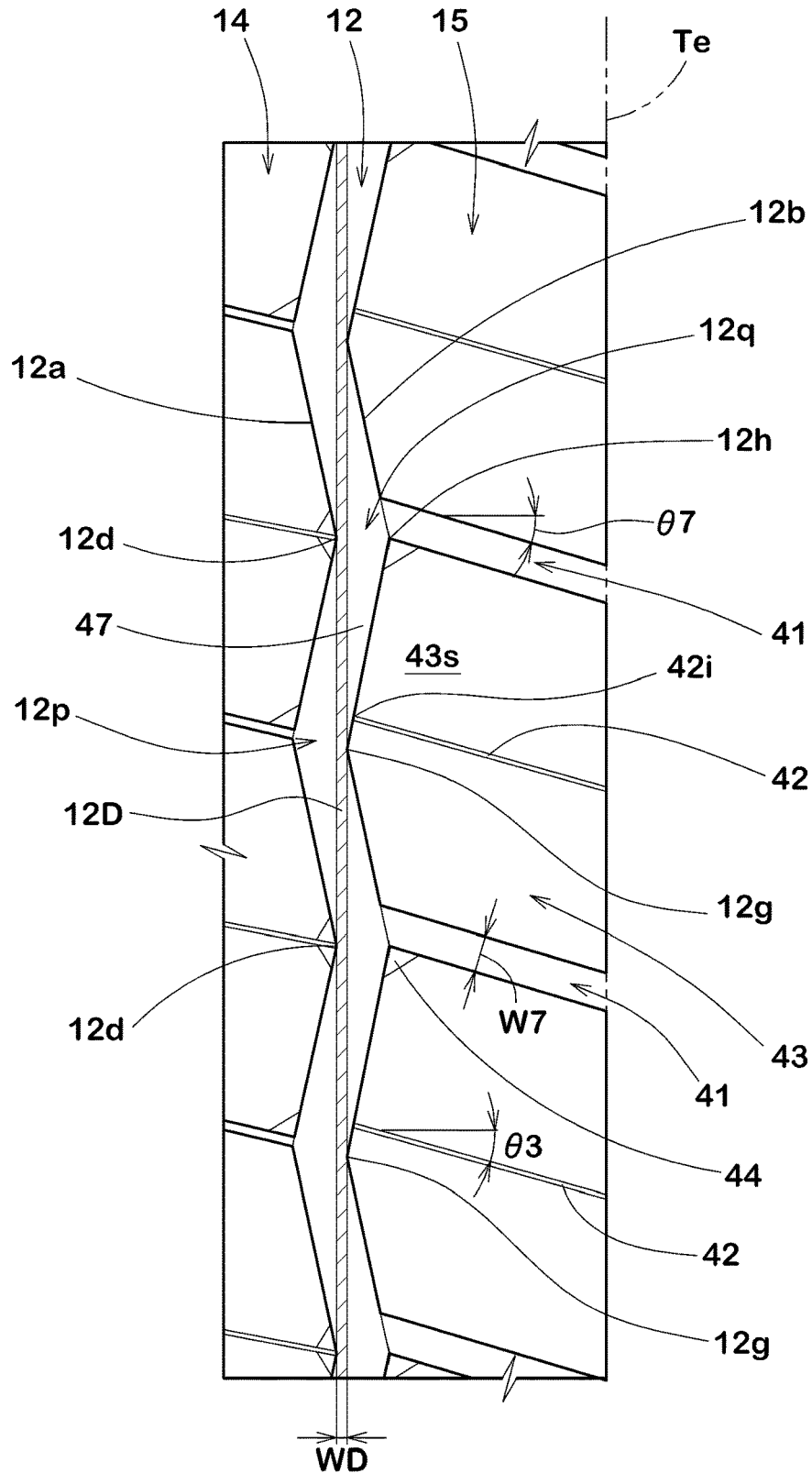
FIG. 8 an enlarged developed view of the shoulder land portion in FIG. 2.

In FIG. 8, there is shown an enlarged view of the shoulder main groove 12 and the shoulder land portion 15. In this embodiment, the shoulder main groove 12 has a linear through part 12D continued in a straight shape along the tire circumferential direction as indicated in FIG. 8 by hatching.

The linear through part 12D is a region defined axially between the second apex portions 12d on the most tread edge Te side of the third groove edge 12a of the shoulder main groove 12 and the first apex portions 12g on the most tire equator C side of the fourth groove edge 12b of the shoulder main groove 12, and being continuous over the entire circumference in the circumferential direction of the tire.

The distance in the tire axial direction between the second apex portions 12d of the third groove edge 12a and the first apex portions 12g of the fourth groove edge 12b, that is, the width WD in the tire axial direction of the linear through part 12D is preferably 2 to 6 mm.

If the width WD is less than 2 mm, there is a possibility that drainage performance of the shoulder main groove 12 is deteriorated. On the other hand, if the width WD is greater than 6 mm, the rigidity in the tire circumferential direction of the shoulder land portion 15 is reduced, and it becomes difficult to reduce the rolling resistance of the tire.

In the shoulder land portion 15, for example, a plurality of shoulder lateral grooves 41, and a plurality of shoulder lateral sipes 42 are provided. The shoulder lateral grooves 41 and the shoulder lateral sipes 42 extend in the tire axial direction, and connect between the shoulder main groove 12 and the tread edge Te.

The shoulder lateral grooves 41 connect between the tread edge Te and the second apex portions 12h of the fourth groove edge 12b of the shoulder main groove 12. Thereby, the shoulder land portion 15 is a block row in which a plurality of shoulder blocks 43 are arranged.

The shoulder lateral grooves 41 are, for example, inclined at an angle θ7 of 5 to 25 degrees with respect to the tire axial direction.

The groove width W7 of the shoulder lateral grooves 41 is, for example, 0.65 to 0.75 times the groove width W2 of the shoulder main grooves 12. Such shoulder lateral grooves 41 effectively increase the wet performance, while maintaining the wear resistance.

By the zigzag shoulder main groove 12 and the adjacent shoulder lateral grooves 41, the tread 43s of the shoulder block 43 in the present embodiment is a substantially pentagonal shape. The tread 43s of the shoulder block 43 has an inner edge 47 which is convex toward the inside in the tire axial direction. Thereby, the rigidity in the tire axial direction of the shoulder block 43 is increased, and the wear resistance of the block is enhanced.

The shoulder lateral sipe 42 connects between the vicinity of the first apex portion 12g of the fourth groove edge 12b of the shoulder main groove 12 and the tread edge Te.

The shoulder lateral sipes 42 are, for example, parallel with the shoulder lateral grooves 41, bisecting the tread surface 43s of the shoulder block 43. By such shoulder lateral sipe 42, the rigidity distribution of the shoulder blocks 43 is optimized, and the wet performance of the shoulder land portion 15 is enhanced.

The shoulder lateral sipe 42 extends straight, while inclining at an angle θ3 of 5 to 25 degrees with respect to the tire axial direction. Such shoulder lateral sipes 42 exhibit excellent edge effect in the tire circumferential direction.

As shown in FIG. 4, the depth d5 of the shoulder lateral sipes 42 is, for example, 70% to 90% of the groove depth d2 of the shoulder main grooves 12. Such shoulder lateral sipes 42 enhance the wet performance and wear resistance in good balance.

If importance is to be attached to the reduction of the rolling resistance, it is desirable that the depth d5 of the shoulder lateral sipes 42 is 50% to 80% of the depth d1 of the center main grooves 11.

If the depth of the shoulder lateral sipes 42 is less than 50% of the depth of the center main grooves 11, although high rigidity of a block alone can be obtained, since the contact area between the side walls of the adjacent blocks is reduced, it becomes difficult to obtain the function to increase the rigidity by making the adjacent blocks to support each other. Therefore, the rigidity of the entire shoulder land portion 15 is reduced, and it becomes difficult to reduce the rolling resistance of the tire.

On the other hand, if the depth of the shoulder lateral sipe 42 exceeds 80% of the depth of the center main groove 11, the rigidity of a block alone is significantly decreased, and it becomes difficult to reduce the rolling resistance of the tire.

It is desirable that, as shown in FIG. 8, the inner end 42i in the tire axial direction of the shoulder lateral sipe 42 is positioned between the apex portion 12q mostly protruding toward the tread edge Te and the apex portion 12p mostly protruding toward the tire equator C of the fourth groove edge 12b of the shoulder main groove 12. Such shoulder lateral sipe 42 effectively suppresses uneven wear of the inner edge 47 of the shoulder block 43.

Chamfered portions 44 are formed at acute angled vertices of block vertices where the shoulder lateral grooves 41 intersect the shoulder main groove 12. The chamfer portions 44 mitigate stress concentration on the block vertices, and suppress damage such as chipping.

Instead of the chamfered portions 44, rounded corner portions may be formed.

The land ratio of the tread portion 2 having the above described structure is preferably 70% to 85%, more preferably from 75% to 82%.

If the land ratio of the tread portion 2 is less than 70%, the wear resistance is lowered. On the other hand, if the land ratio of the tread portion 2 is more than 85%, there is a possibility that drainage performance of the tread portion 2 is deteriorated.

According to the heavy duty tire 1 of the present embodiment having the configuration described above, the middle land portions 14 are divided into the middle blocks 33 having the hexagonal shape by the zigzag center main grooves 11 and shoulder main grooves 12, the adjacent middle lateral shallow grooves 30, and the adjacent first middle lateral sipes 31, therefore, the middle land portions 14 have high rigidity. Such tire has a small rolling resistance, and excellent wear resistance in the middle land portions 14.

In the present invention, the drainage performance of the middle land portions 14 is enhanced by the middle lateral shallow grooves 30 and the first middle lateral sipes 31. Further, since the adjacent middle blocks 33 mutually contact and support each other through the first middle lateral sipes 31, the rigidity of the middle land portions 14 is increased. Thereby, movements of the middle blocks 33 in the ground contacting patch are suppressed, and uneven wear is suppressed.

Further, in the shoulder main groove 12, as the distance in the tire axial direction between the second apex portions 12*d* of the third groove edge 12*a* on the most of the tread edge Te side and the first apex portions 12*g* of the fourth groove edge 12*b* on the most tire equator C side is 2 to 6 mm, water is discharged in a straight line through the shoulder main groove 12. By such shoulder main groove 12, sufficient drainage performance is obtained, and the wet performance of the tire is enhanced.

While detailed description has been made of the heavy duty tire of the present invention, the present invention can be embodied in various forms without being limited to the above-described specific embodiment.

Working Examples

Heavy duty tires of size 315/80R22.5 having the basic structure shown in FIG. 1 were experimentally manufactured based on specifications shown in Tables 1 to 4, and tested for the rolling resistance, wet performance and uneven wear resistance under conditions of internal pressure 850 kPa and rim 22.5×9.00.

Testing methods were as follows.

<Rolling Resistance Performance>

Using a rolling resistance tester, the rolling resistance of each test tire was measured at a speed of 80 km/h and a load of 33.34 kN. The result is an index based on working example 1 being 100, wherein the large the value, the smaller the rolling resistance, which means that the fuel efficiency is better.

<Wet Performance>

Each test tire was mounted on every wheel of a truck (2-D vehicle) with a maximum loading capacity of 10 tons. The vehicle in a semi-loaded state (loaded in a front of the loading platform) was brought into a wet asphalt road surface with a water film having 5 mm thickness. Then, the clutch was connected, keeping the engine speed at 1500 rpm and the transmission at the second gear, and the elapsed time for traveling 10 meters was measured from the moment at which the clutch was connected. The results are reciprocals of the respective elapsed times which are indicated by an index based on the value of Example 1 being 100. The evaluation is such that the larger the numeric value, the better the wet performance.

<Uneven Wear Resistance Performance>

Each test tire was mounted on every wheel of a truck (2-D vehicle) with a maximum loading capacity of 10 tons. The vehicle was run for 10000 km with the rated load, and a height difference was measured between the block edges located on both sides in the tire circumferential direction of the first middle lateral sipe 31. The results are indicated by an index based on the value of Example 1 being 100. The evaluation is such that the larger the numerical value, the better the uneven wear resistance.

TABLE 1

| Item | working example 1 | working example 2 | working example 3 | working example 4 | comparative example 1 | comparative example 2 | comparative example 3 | working example 5 | working example 6 | comparative example 4 | comparative example 5 | working example 7 |
|---|---|---|---|---|---|---|---|---|---|---|---|---|
| linear through part width WD(mm) | 3.0 | 2.0 | 5.0 | 6.0 | 0.0 | 1.0 | 7.0 | 3.0 | 3.0 | 3.0 | 3.0 | 3.0 |
| middle lateral shallow groove depth relative to center main groove depth (%) | 20 | 20 | 20 | 20 | 20 | 20 | 20 | 10 | 30 | 0 | 40 | 20 |
| middle lateral shallow groove depth + first middle lateral sipe depth relative to center main groove depth (%) | 75 | 75 | 75 | 75 | 75 | 75 | 75 | 75 | 75 | 75 | 75 | 50 |
| Ac/Bc | 0.78 | 0.78 | 0.78 | 0.78 | 0.78 | 0.78 | 0.78 | 0.78 | 0.78 | 0.78 | 0.78 | 0.78 |
| Am/Bm | 0.78 | 0.78 | 0.78 | 0.78 | 0.78 | 0.78 | 0.78 | 0.78 | 0.78 | 0.78 | 0.78 | 0.78 |
| Li/Pm | 0.20 | 0.20 | 0.20 | 0.20 | 0.20 | 0.20 | 0.20 | 0.20 | 0.20 | 0.20 | 0.20 | 0.20 |
| Wm/Wc | 1.05 | 1.05 | 1.05 | 1.05 | 1.05 | 1.05 | 1.05 | 1.05 | 1.05 | 1.05 | 1.05 | 1.05 |
| Ws/Wc | 1.08 | 1.08 | 1.08 | 1.08 | 1.08 | 1.08 | 1.08 | 1.08 | 1.08 | 1.08 | 1.08 | 1.08 |
| θ (deg.) | 12 | 12 | 12 | 12 | 12 | 12 | 12 | 12 | 12 | 12 | 12 | 12 |
| number of middle lateral shallow grooves | 40 | 40 | 40 | 40 | 40 | 40 | 40 | 40 | 40 | 40 | 40 | 40 |
| land ratio (%) | 80 | 80 | 80 | 80 | 80 | 80 | 80 | 80 | 80 | 80 | 80 | 80 |

TABLE 1-continued

| Item | working example 1 | working example 2 | working example 3 | working example 4 | comparative example 1 | comparative example 2 | comparative example 3 | working example 5 | working example 6 | comparative example 4 | comparative example 5 | working example 7 |
|---|---|---|---|---|---|---|---|---|---|---|---|---|
| rolling resistance (index) | 100 | 100 | 100 | 100 | 100 | 100 | 90 | 105 | 95 | 100 | 90 | 95 |
| wet performance (index) | 100 | 100 | 100 | 100 | 87 | 90 | 100 | 95 | 100 | 90 | 100 | 100 |
| uneven wear resistance (index) | 100 | 100 | 100 | 100 | 100 | 100 | 100 | 100 | 100 | 100 | 100 | 100 |

TABLE 2

| Item | working example 8 | working example 9 | comparative example 6 | comparative example 7 | working example 10 | working example 11 | working example 12 | working example 13 | comparative example 8 | comparative example 9 | working example 14 | working example 15 |
|---|---|---|---|---|---|---|---|---|---|---|---|---|
| linear through part width WD(mm) | 3.0 | 3.0 | 3.0 | 3.0 | 3.0 | 3.0 | 3.0 | 3.0 | 3.0 | 3.0 | 3.0 | 3.0 |
| middle lateral shallow groove depth relative to center main groove depth (%) | 20 | 20 | 20 | 20 | 20 | 20 | 20 | 20 | 20 | 20 | 20 | 20 |
| middle lateral shallow groove depth + first middle lateral sipe depth relative to center main groove depth (%) | 65 | 80 | 40 | 85 | 75 | 75 | 75 | 75 | 75 | 75 | 75 | 75 |
| Ac/Bc | 0.78 | 0.78 | 0.78 | 0.78 | 0.75 | 0.77 | 0.82 | 0.85 | 0.50 | 0.90 | 0.78 | 0.78 |
| Am/Bm | 0.78 | 0.78 | 0.78 | 0.78 | 0.75 | 0.77 | 0.82 | 0.85 | 0.50 | 0.90 | 0.78 | 0.78 |
| Li/Pm | 0.20 | 0.20 | 0.20 | 0.20 | 0.20 | 0.20 | 0.20 | 0.20 | 0.20 | 0.20 | 0.10 | 0.30 |
| Wm/Wc | 1.05 | 1.05 | 1.05 | 1.05 | 1.05 | 1.05 | 1.05 | 1.05 | 1.05 | 1.05 | 1.05 | 1.05 |
| Ws/Wc | 1.08 | 1.08 | 1.08 | 1.08 | 1.08 | 1.08 | 1.08 | 1.08 | 1.08 | 1.08 | 1.08 | 1.08 |
| θ (deg.) | 12 | 12 | 12 | 12 | 12 | 12 | 12 | 12 | 12 | 12 | 12 | 12 |
| number of middle lateral shallow grooves | 40 | 40 | 40 | 40 | 40 | 40 | 40 | 40 | 40 | 40 | 40 | 40 |
| land ratio (%) | 80 | 80 | 80 | 80 | 80 | 80 | 80 | 80 | 80 | 80 | 80 | 80 |
| rolling resistance (index) | 95 | 95 | 80 | 85 | 100 | 100 | 98 | 95 | 90 | 85 | 100 | 100 |
| wet performance (index) | 100 | 100 | 100 | 100 | 100 | 100 | 100 | 100 | 100 | 100 | 100 | 100 |
| uneven wear resistance (index) | 98 | 98 | 85 | 85 | 95 | 98 | 100 | 100 | 80 | 90 | 98 | 100 |

TABLE 3

| Item | working example 16 | comparative example 10 | comparative example 11 | working example 17 | working example 18 | comparative example 12 | comparative example 13 | comparative example 14 | working example 19 | working example 20 | comparative example 15 | comparative example 16 |
|---|---|---|---|---|---|---|---|---|---|---|---|---|
| linear through part width WD(mm) | 3.0 | 3.0 | 3.0 | 3.0 | 3.0 | 3.0 | 3.0 | 3.0 | 3.0 | 3.0 | 3.0 | 3.0 |
| middle lateral shallow groove depth relative to center main groove depth (%) | 20 | 20 | 20 | 20 | 20 | 20 | 20 | 20 | 20 | 20 | 20 | 20 |
| middle lateral shallow groove depth + first middle lateral sipe depth relative to center main groove depth (%) | 75 | 75 | 75 | 75 | 75 | 75 | 75 | 75 | 75 | 75 | 75 | 75 |
| Ac/Bc | 0.78 | 0.78 | 0.78 | 0.78 | 0.78 | 0.78 | 0.78 | 0.78 | 0.78 | 0.78 | 0.78 | 0.78 |
| Am/Bm | 0.78 | 0.78 | 0.78 | 0.78 | 0.78 | 0.78 | 0.78 | 0.78 | 0.78 | 0.78 | 0.78 | 0.78 |
| Li/Pm | 0.40 | 0.05 | 0.50 | 0.20 | 0.20 | 0.20 | 0.20 | 0.20 | 0.20 | 0.20 | 0.20 | 0.20 |
| Wm/Wc | 1.05 | 1.05 | 1.05 | 1.00 | 1.08 | 0.97 | 1.05 | 1.00 | 1.05 | 1.05 | 1.05 | 1.05 |
| Ws/Wc | 1.08 | 1.08 | 1.08 | 1.03 | 1.13 | 1.00 | 1.15 | 1.15 | 1.08 | 1.08 | 1.08 | 1.08 |
| θ (deg.) | 12 | 12 | 12 | 12 | 12 | 12 | 12 | 12 | 5 | 20 | 0 | 30 |
| number of middle lateral shallow grooves | 40 | 40 | 40 | 40 | 40 | 40 | 40 | 40 | 40 | 40 | 40 | 40 |
| land ratio (%) | 80 | 80 | 80 | 80 | 80 | 80 | 80 | 80 | 80 | 80 | 80 | 80 |
| rolling resistance (index) | 98 | 100 | 90 | 102 | 98 | 100 | 90 | 90 | 100 | 98 | 100 | 90 |
| wet performance (index) | 100 | 100 | 100 | 100 | 100 | 100 | 100 | 100 | 98 | 100 | 90 | 100 |
| uneven wear resistance (index) | 100 | 90 | 100 | 98 | 100 | 90 | 100 | 100 | 100 | 100 | 100 | 100 |

TABLE 4

| Item | working example 21 | working example 22 | working example 23 | working example 24 | comparative example 17 | comparative example 18 | working example 25 | working example 26 | working example 27 | working example 28 | comparative example 19 | comparative example 20 |
|---|---|---|---|---|---|---|---|---|---|---|---|---|
| linear through part width WD(mm) | 3.0 | 3.0 | 3.0 | 3.0 | 3.0 | 3.0 | 3.0 | 3.0 | 3.0 | 3.0 | 3.0 | 3.0 |
| middle lateral shallow groove depth relative to center main groove depth (%) | 20 | 20 | 20 | 20 | 20 | 20 | 20 | 20 | 20 | 20 | 20 | 20 |
| middle lateral shallow groove depth + first middle lateral sipe depth relative to center main groove depth (%) | 75 | 75 | 75 | 75 | 75 | 75 | 75 | 75 | 75 | 75 | 75 | 75 |
| Ac/Bc | 0.78 | 0.78 | 0.78 | 0.78 | 0.78 | 0.78 | 0.78 | 0.78 | 0.78 | 0.78 | 0.78 | 0.78 |
| Am/Bm | 0.78 | 0.78 | 0.78 | 0.78 | 0.78 | 0.78 | 0.78 | 0.78 | 0.78 | 0.78 | 0.78 | 0.78 |
| Li/Pm | 0.20 | 0.20 | 0.20 | 0.20 | 0.20 | 0.20 | 0.20 | 0.20 | 0.20 | 0.20 | 0.20 | 0.20 |
| Wm/Wc | 1.05 | 1.05 | 1.05 | 1.05 | 1.05 | 1.05 | 1.05 | 1.05 | 1.05 | 1.05 | 1.05 | 1.05 |
| Ws/Wc | 1.08 | 1.08 | 1.08 | 1.08 | 1.08 | 1.08 | 1.08 | 1.08 | 1.08 | 1.08 | 1.08 | 1.08 |
| θ (deg.) | 12 | 12 | 12 | 12 | 12 | 12 | 12 | 12 | 12 | 12 | 12 | 12 |
| number of middle lateral shallow grooves | 35 | 38 | 42 | 45 | 33 | 48 | 40 | 40 | 40 | 40 | 40 | 40 |
| land ratio (%) | 80 | 80 | 80 | 80 | 80 | 80 | 70 | 75 | 82 | 85 | 50 | 90 |
| rolling resistance (index) | 102 | 100 | 100 | 98 | 100 | 90 | 95 | 98 | 100 | 100 | 85 | 100 |
| wet performance (index) | 95 | 98 | 102 | 105 | 90 | 100 | 100 | 100 | 95 | 93 | 100 | 80 |
| uneven wear resistance (index) | 100 | 100 | 100 | 100 | 100 | 100 | 100 | 98 | 100 | 100 | 80 | 100 |

As apparent from Tables 1-4, it was confirmed that, in comparison with the comparative examples, in the heavy duty tires as working examples, the uneven wear resistance was significantly improved, while enhancing the rolling resistance performance and wet performance.

Further, heavy duty tires of size 315/80R22.5 having the basic structure shown in FIG. 1 were experimentally manufactured based on specifications shown in Table 1.

As Comparative Example 21, a tire was experimentally manufactured, which, as shown in FIG. 9, included the center main grooves and shoulder main grooves having the same groove width and the center sipes and middle sipes extending along the tire axial direction.

Each test tire was tested for the uneven wear resistance and wet performance.

Common specifications to all of the test tires and test methods are as follows.
Mounting rim: 7.50×22.5
Tire pressure: 800 kPa
Test vehicle: 10 ton truck, a load of 50% of a normal load capacity was placed in a front of the loading platform
Tire mounting position: all wheels <Wear Resistance>
With the above-mentioned test vehicle, after running on public highways for a fixed distance, the remaining groove depth of the center main groove was measured. The results are indicated by an index based on comparative Example 21 being 100, wherein the larger the numerical value, the better the wear resistance.

<Wet Performance>
With the test vehicle, the elapsed time to pass through a test course of a full length of 10 meters was measured under the following conditions.
Road surface: asphalt with a water film of 5 mm thickness
How to start: start by connecting the clutch keeping the second gear and 1500 rpm The evaluation is the inverse of the elapsed time, and indicated by an index based on Comparative Example 21 being 100. The larger the numeric value, the shorter the elapsed time, and the better the wet performance.

The test results are shown in Table 5.

TABLE 5

| | comparative example 21 | working example 29 | working example 30 | working example 31 | working example 32 | working example 33 | working example 34 | working example 35 | working example 36 |
|---|---|---|---|---|---|---|---|---|---|
| tread pattern | FIG. 9 | FIG. 3 | FIG. 3 | FIG. 3 | FIG. 3 | FIG. 3 | FIG. 3 | FIG. 3 | FIG. 3 |
| shoulder main groove width W2/center main groove width W1 | 1.0 | 2.1 | 1.5 | 1.8 | 2.4 | 2.6 | 2.1 | 2.1 | 2.1 |
| center main groove angle θ5 (deg.) | 0.0 | 15.0 | 15.0 | 15.0 | 15.0 | 15.0 | 5.0 | 25.0 | 30.0 |
| shoulder main groove angle θ6 (deg.) | 0.0 | 15.0 | 15.0 | 15.0 | 15.0 | 15.0 | 15.0 | 15.0 | 15.0 |
| center sipe angle θ1 (deg.) | 0.0 | 20.0 | 20.0 | 20.0 | 20.0 | 20.0 | 20.0 | 20.0 | 20.0 |
| middle sipe angle θ2 (deg.) | 0.0 | 12.0 | 12.0 | 12.0 | 12.0 | 12.0 | 12.0 | 12.0 | 12.0 |
| wear resistance (index) | 100 | 107 | 106 | 106 | 106 | 104 | 105 | 109 | 110 |
| wet performance (index) | 100 | 105 | 104 | 105 | 106 | 106 | 107 | 103 | 102 |

TABLE 5-continued

| | working example 37 | working example 38 | working example 39 | working example 40 | working example 41 | working example 42 | working example 43 | working example 44 | working example 45 |
|---|---|---|---|---|---|---|---|---|---|
| tread pattern | FIG. 3 | FIG. 3 | FIG. 3 | FIG. 3 | FIG. 3 | FIG. 3 | FIG. 3 | FIG. 3 | FIG. 3 |
| shoulder main groove width W2/ center main groove width W1 | 2.1 | 2.1 | 2.1 | 2.1 | 2.1 | 2.1 | 2.1 | 2.1 | 2.1 |
| center main groove angle θ5 (deg.) | 15.0 | 15.0 | 15.0 | 15.0 | 15.0 | 15.0 | 15.0 | 15.0 | 15.0 |
| shoulder main groove angle θ6 (deg.) | 5.0 | 25.0 | 30.0 | 15.0 | 15.0 | 15.0 | 15.0 | 15.0 | 15.0 |
| center sipe angle θ1 (deg.) | 20.0 | 20.0 | 20.0 | 10.0 | 15.0 | 25.0 | 25.0 | 25.0 | 15.0 |
| middle sipe angle θ2 (deg.) | 12.0 | 12.0 | 12.0 | 5.0 | 10.0 | 20.0 | 5.0 | 15.0 | 5.0 |
| wear resistance (index) | 106 | 108 | 109 | 107 | 107 | 104 | 105 | 105 | 106 |
| wet performance (index) | 106 | 104 | 102 | 103 | 104 | 107 | 104 | 105 | 105 |

From the test results, it was confirmed that the pneumatic tires of the present invention possess excellent wet performance and wear resistance.

DESCRIPTION OF THE SIGNS 1 heavy duty tire
2 tread portion
11 center main groove
11a first groove edge
11b second groove edge
11g first apex portion
11h second apex portion
11i longitudinal edge
12 shoulder main groove
12D linear through part
12a third groove edge
12b fourth groove edge
12c first apex portion
12d second apex portion
12c first apex portion
12d second apex portion
13 center land portion
14 middle land portion
15 shoulder land portion
30 middle lateral shallow groove
31 first middle lateral sipe
32 second middle lateral sipe

The invention claimed is:

1. A heavy duty tire comprising:
a tread portion provided with
a pair of center main grooves disposed by having one center main groove on one side of the tire equator and the other center main groove on the other side of the tire equator, and each center main groove extending in a zigzag shape continuously in the tire circumferential direction, and
a pair of shoulder main grooves disposed outside the respective center main grooves in the tire axial direction and each extending in a zigzag shape continuously in the tire circumferential direction
so that
a center land portion between a pair of the center main grooves,
a pair of middle land portions between the center main grooves and the shoulder main grooves, and
a pair of shoulder land portions located outside the shoulder main grooves in the tire axial direction are defined, wherein
each of the center main grooves has a first groove edge on the tire equator side and a second groove edge on the tread edge side,
each of the shoulder main grooves has a third groove edge on the tire equator side and a fourth groove edge on the tread edge side,
each of the middle land portions is provided with
a plurality of middle lateral shallow grooves connecting the most tread edge side apex portions of the second groove edge of the adjacent center main groove, and the most tire equator side apex portions of the third groove edge of the adjacent shoulder main groove,
a plurality of first middle lateral sipes extending along the respective middle lateral shallow grooves at the groove bottoms of the middle lateral shallow grooves and connecting the adjacent shoulder main groove and the adjacent center main groove, and
a plurality of second middle lateral sipes
formed between the circumferentially adjacent middle lateral shallow grooves and connecting
the most tire equator side apex portions of the second groove edge of the adjacent center main groove and the most tread edge side apex portions of the third groove edge of the adjacent shoulder main groove,
wherein
each of the center main grooves has a groove width such that the groove width at apex portions of the center main groove mostly protruding toward the tread edge is larger than the groove width at apex portions of the center main groove mostly protruding toward the tire equator.

2. The heavy duty tire according to claim 1, wherein the groove depth of the middle lateral shallow grooves is 10% to 30% of the groove depth of the center main grooves.

3. The heavy duty tire according to claim 1, wherein the sum of the groove depth of the middle lateral shallow grooves and the depth of the first middle lateral sipes, and
the depth of the second middle lateral sipes are 50% to 80% of the groove depth of the center main grooves.

4. The heavy duty tire according to claim 1, wherein
a ratio Bm/Am of
a length Am in the tire axial direction between the most tire equator side apex portions of said second groove edge and the most tread edge side apex portions of the third groove edge, and
a length Bm in the tire axial direction between the most tread edge side apex portions of the second groove edge and the most tire equator side apex portions of the third groove edge
is 0.75 to 0.85.

5. The heavy duty tire according to claim 1, wherein a ratio Bc/Ac of
- a length Ac in the tire axial direction between the most tread edge side apex portions of the first groove edge on one side of the tire equator, and the most tread edge side apex portions of the first groove edge on the other side of the tire equator, and
- a length Bc in the tire axial direction between the most tire equator side apex portions of the first groove edge on the one side and the most tire equator side apex portions of the first groove edge on the other side
- is 0.75 to 0.85.

6. The heavy duty tire according to claim 1, wherein a distance in the tire axial direction between
- the most tread edge side apex portions of the third groove edge, and the most tire equator side apex portions of the fourth groove edge of each of the shoulder main grooves
- is 2 to 6 mm.

7. The heavy duty tire according to claim 1, wherein the most tire equator side apex portion of the second groove edge of the center main groove is provided with a longitudinal edge extending along the tire circumferential direction, and
- a ratio L/P of a length L in the tire circumferential direction of the longitudinal edge, and the interval P between the circumferentially adjacent first middle lateral sipes
- is 0.1 to 0.4.

8. The heavy duty tire according to claim 1, wherein the ratio Wc: Wm: Ws of
- an average width Wc in the tire axial direction of the center land portion, an average width Wm in the tire axial direction of the middle land portions, and an average width Ws in the tire axial direction of the shoulder land portions
- is 1.00:1.00 to 1.08:1.03 to 1.13.

9. The heavy duty tire according to claim 1, wherein the middle lateral shallow grooves, the first middle lateral sipes and the second middle lateral sipes provided in the middle land portion on one side of the tire equator are different in the direction with respect to the tire axial direction from the middle lateral shallow grooves, the first middle lateral sipes and the second middle lateral sipes provided in the middle land portion on the other side of the tire equator.

10. The heavy duty tire according to claim 1, wherein the first middle lateral sipes and the second middle lateral sipes provided in each of the middle land portions are parallel with each other.

11. The heavy duty tire according to claim 1, wherein the center main groove and the shoulder main groove on one side of the tire equator are shifted in the circumferential direction with respect to zigzag phase from the center main groove and the shoulder main groove on the other side of the tire equator.

12. The heavy duty tire according to claim 1, wherein the groove width of the shoulder main grooves is larger than the groove width of the center main grooves,
- the center land portion is provided with a plurality of center lateral sipes connecting between a pair of the center main grooves and inclined at an angle $\theta 1$ of 5 to 25 degrees with respect to the tire axial direction,
- each of the middle lateral sipes is inclined at an angle $\theta 2$ of 5 to 25 degrees with respect to the tire axial direction, and
- the angle $\theta 1$ of the center lateral sipes is larger than the angle $\theta 2$ of each of the middle lateral sipes.

13. The heavy duty tire according to claim 12, wherein the center lateral sipes include
- first center sipes connecting between the apex portions of the first groove edges of the center main grooves mostly protruding toward the tire equator, and
- second center sipes connecting between the apex portions of the first groove edges of the center main grooves mostly protruding toward the tread edges.

14. The heavy duty tire according to claim 12, wherein the middle lateral sipes respectively continue to the center lateral sipes through the center main grooves.

15. The heavy duty tire according to claim 12, wherein each of the center lateral sipes and each of the middle lateral sipes are straight.

16. The heavy duty tire according to claim 1, wherein
- in each of the center main grooves, the apex portions of the center main groove mostly protruding toward the tread edge is bent toward such direction that the second groove edge protrudes toward the outer side in the tire axial direction, and the first groove edge extends along the tire circumferential direction.

17. The heavy duty tire according to claim 1, wherein
- each of the shoulder land portions is provided with a plurality of shoulder lateral sipes connecting between the adjacent shoulder main groove and the tread edge and inclined at an angle $\theta 3$ of 5 to 25 degrees with respect to the tire axial direction, and
- the inner ends in the tire axial direction of the shoulder lateral sipes are located between
- the apex portions mostly protruding toward the tire equator and
- the apex portions mostly protruding toward the tread edge of the fourth groove edge of the shoulder main groove.

18. The heavy duty tire according to claim 1, wherein angles with respect to the tire axial direction of the middle lateral shallow grooves, the first middle lateral sipes and the second middle lateral sipes are 5 to 20 degrees.

19. The heavy duty tire according to claim 1, wherein the respective numbers of the middle lateral shallow grooves, the first middle lateral sipes and the second middle lateral sipes provided in one of the middle land portions are 35 to 45.

20. The heavy duty tire according to claim 1, wherein the land ratio of the tread portion is 70% to 85%.

* * * * *